US007107273B2

(12) United States Patent
Ohata et al.

(10) Patent No.: US 7,107,273 B2
(45) Date of Patent: Sep. 12, 2006

(54) METHOD AND PROGRAM OF COLLECTING PERFORMANCE DATA FOR STORAGE NETWORK

(75) Inventors: Hideo Ohata, Fujisawa (JP); Tatsundo Aoshima, Sagamihara (JP); Kei Takeda, Kawasaki (JP); Nobuyuki Yamashita, Yokohama (JP); Takato Kusama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 216 days.

(21) Appl. No.: 10/789,472

(22) Filed: Feb. 27, 2004

(65) Prior Publication Data

US 2005/0119996 A1    Jun. 2, 2005

(30) Foreign Application Priority Data

Nov. 28, 2003  (JP) ............................. 2003-398392

(51) Int. Cl.
*G06F 7/00*  (2006.01)
*G06F 17/30*  (2006.01)
*G06F 15/173*  (2006.01)
*G06F 12/00*  (2006.01)
*G06F 12/14*  (2006.01)
*G06F 12/16*  (2006.01)
*G06F 13/00*  (2006.01)
*G06F 13/28*  (2006.01)

(52) U.S. Cl. ...................... 707/10; 709/223; 709/224; 711/114

(58) Field of Classification Search ................. 707/103, 707/200; 709/220–226, 238–244; 702/182–186; 714/39, 43, 47; 711/114
See application file for complete search history.

(56) References Cited

U.S. PATENT DOCUMENTS

| | | | | |
|---|---|---|---|---|
| 5,067,099 A | * | 11/1991 | McCown et al. | 702/183 |
| 5,742,819 A | * | 4/1998 | Caccavale | 707/200 |
| 6,405,327 B1 | * | 6/2002 | Sipple et al. | 714/39 |
| 6,449,663 B1 | * | 9/2002 | Carney et al. | 710/15 |
| 6,505,248 B1 | | 1/2003 | Casper et al. | |
| 6,609,083 B1 | * | 8/2003 | Enck et al. | 702/186 |
| 6,975,963 B1 | * | 12/2005 | Hamilton et al. | 702/182 |
| 2001/0054093 A1 | * | 12/2001 | Iwatani | 709/223 |
| 2003/0061331 A1 | * | 3/2003 | Nakamura et al. | 709/223 |
| 2004/0102925 A1 | | 5/2004 | Giffords | |
| 2004/0193827 A1 | * | 9/2004 | Mogi et al. | 711/170 |
| 2005/0076113 A1 | | 4/2005 | Klotz et al. | |
| 2005/0086554 A1 | | 4/2005 | Simes | |

* cited by examiner

*Primary Examiner*—Uyen Le
*Assistant Examiner*—Cheryl M Shechtman
(74) *Attorney, Agent, or Firm*—Mattingly, Stanger, Malur & Brundidge, P.C.

(57) ABSTRACT

In a storage network including at least a computer system, at least an external storage and at least a network system for communication of input/output data between the computer system and the external storage, a method of collecting the performance data on the network system and the software operated on the network system, in which the range or degree of data collection is automatically adjusted as required based on the performance data collected.

24 Claims, 25 Drawing Sheets

| | | 401 |
|---|---|---|
| | DATE & TIME | 2003/07/31 13:00:00 |

| RESOURCE | NUMBER OF I/O PER SEC [IO/s] | TRANSFER RATE [KB/s] |
|---|---|---|
| VOLUME A | 165.3 | 1,757.6 |
| VOLUME B | 120.4 | 809.3 |
| VOLUME C | 14.0 | 226.7 |
| VOLUME D | 0.0 | 0.0 |

DB OBJECT-TABLE SPACE RELATION TABLE — 801

| TABLE A | TABLE SPACE A |
|---------|---------------|
| TABLE B | TABLE SPACE A |
| INDEX A | TABLE SPACE B |
| TABLE C | TABLE SPACE C |
| INDEX B | TABLE SPACE C |

TABLE SPACE-FILE RELATION TABLE — 804

| TABLE SPACE A | FILE A |
|---------------|--------|
| TABLE SPACE A | FILE B |
| TABLE SPACE A | FILE C |
| TABLE SPACE B | FILE D |
| TABLE SPACE B | FILE E |
| TABLE SPACE C | FILE F |
| TABLE SPACE C | FILE G |

PERFORMANCE DATA COLLECTION STATUS TABLE — 901

| TABLE A | NUMBER OF RECORDS INSERTED | OFF | 2003/07/31 15:00:00 |
|---|---|---|---|
| TABLE A | NUMBER OF RECORDS READ | OFF | 2003/07/31 15:00:00 |
| TABLE A | NUMBER OF RECORDS UPDATED | OFF | 2003/07/31 15:00:00 |
| TABLE A | NUMBER OF RECORDS DELETED | OFF | 2003/07/31 15:00:00 |
| ⋮ | ⋮ | ⋮ | ⋮ |
| TABLE SPACE A | NUMBER OF I/O PER SEC | HOUR | 2003/07/31 15:00:00 |
| TABLE SPACE A | NUMBER READ PER SEC | OFF | 2003/07/31 15:00:00 |
| TABLE SPACE A | NUMBER WRITTEN PER SEC | OFF | 2003/07/31 15:00:00 |
| TABLE SPACE A | TRANSFER RATE | HOUR | 2003/07/31 15:00:00 |
| TABLE SPACE A | READ TRANSFER RATE | OFF | 2003/07/31 15:00:00 |
| TABLE SPACE A | WRITE TRANSFER RATE | OFF | 2003/07/31 15:00:00 |
| TABLE SPACE B | NUMBER OF I/O PER SEC | HOUR | 2003/07/31 15:00:00 |
| TABLE SPACE B | NUMBER READ PER SEC | OFF | 2003/07/31 15:00:00 |
| TABLE SPACE B | NUMBER WRITTEN PER SEC | OFF | 2003/07/31 15:00:00 |
| TABLE SPACE B | TRANSFER RATE | HOUR | 2003/07/31 15:00:00 |
| TABLE SPACE B | READ TRANSFER RATE | OFF | 2003/07/31 15:00:00 |
| TABLE SPACE B | WRITE TRANSFER RATE | OFF | 2003/07/31 15:00:00 |
| TABLE SPACE C | NUMBER OF I/O PER SEC | HOUR | 2003/07/31 15:00:00 |
| TABLE SPACE C | NUMBER READ PER SEC | OFF | 2003/07/31 15:00:00 |
| TABLE SPACE C | NUMBER WRITTEN PER SEC | OFF | 2003/07/31 15:00:00 |
| TABLE SPACE C | TRANSFER RATE | HOUR | 2003/07/31 15:00:00 |
| TABLE SPACE C | READ TRANSFER RATE | OFF | 2003/07/31 15:00:00 |
| TABLE SPACE C | WRITE TRANSFER RATE | OFF | 2003/07/31 15:00:00 |
| 902 | 903 | 904 | 905 |

FIG.10
METRICS VALUE TABLE ~1001

| 2003/07/31 13:00:00 | TABLE SPACE A | NUMBER OF I/O PER SEC | 165.3 |
|---|---|---|---|
| 2003/07/31 13:00:00 | TABLE SPACE A | TRANSFER RATE | 1,757.6 |
| 2003/07/31 13:00:00 | TABLE SPACE B | NUMBER OF I/O PER SEC | 120.4 |
| 2003/07/31 13:00:00 | TABLE SPACE B | TRANSFER RATE | 809.3 |
| 2003/07/31 13:00:00 | TABLE SPACE C | NUMBER OF I/O PER SEC | 14.0 |
| 2003/07/31 13:00:00 | TABLE SPACE C | TRANSFER RATE | 226.7 |
| 2003/07/31 14:00:00 | TABLE SPACE A | NUMBER OF I/O PER SEC | 165.1 |
| 2003/07/31 14:00:00 | TABLE SPACE A | TRANSFER RATE | 1,757.4 |
| 2003/07/31 14:00:00 | TABLE SPACE B | NUMBER OF I/O PER SEC | 154.1 |
| 2003/07/31 14:00:00 | TABLE SPACE B | TRANSFER RATE | 1,002.1 |
| 2003/07/31 14:00:00 | TABLE SPACE C | NUMBER OF I/O PER SEC | 19.4 |
| 2003/07/31 14:00:00 | TABLE SPACE C | TRANSFER RATE | 314.2 |
| 2003/07/31 15:00:00 | TABLE SPACE A | NUMBER OF I/O PER SEC | 165.8 |
| 2003/07/31 15:00:00 | TABLE SPACE A | TRANSFER RATE | 1,757.7 |
| 2003/07/31 15:00:00 | TABLE SPACE B | NUMBER OF I/O PER SEC | 152.7 |
| 2003/07/31 15:00:00 | TABLE SPACE B | TRANSFER RATE | 1,003.3 |
| 2003/07/31 15:00:00 | TABLE SPACE C | NUMBER OF I/O PER SEC | 19.0 |
| 2003/07/31 15:00:00 | TABLE SPACE C | TRANSFER RATE | 308.1 |

1002　1003　1004　1005

FIG.11A
FILE-VOLUME RELATION TABLE ~1101

| FILE A | VOLUME A |
|---|---|
| FILE B | VOLUME A |
| FILE C | VOLUME A |
| FILE D | VOLUME B |
| FILE E | VOLUME B |
| FILE F | VOLUME C |
| FILE G | VOLUME C |

1102　1103

FIG.11B
VOLUME-LOGICAL VOLUME-PORT RELATION TABLE ~1104

| VOLUME A | LOGICAL VOLUME A | PORT A | PORT N |
|---|---|---|---|
| VOLUME B | LOGICAL VOLUME B | PORT A | PORT N |
| VOLUME C | LOGICAL VOLUME C | PORT A | PORT O |

PERFORMANCE DATA COLLECTION STATUS TABLE 1201

| FILE A | NUMBER OF I/O PER SEC | OFF | 2003/07/31 15:00:00 |
|---|---|---|---|
| FILE A | NUMBER READ PER SEC | OFF | 2003/07/31 15:00:00 |
| FILE A | NUMBER WRITTEN PER SEC | OFF | 2003/07/31 15:00:00 |
| FILE A | TRANSFER RATE | OFF | 2003/07/31 15:00:00 |
| FILE A | READ TRANSFER RATE | OFF | 2003/07/31 15:00:00 |
| FILE A | WRITE TRANSFER RATE | OFF | 2003/07/31 15:00:00 |
| ⋮ | ⋮ | ⋮ | ⋮ |
| VOLUME A | NUMBER OF I/O PER SEC | HOUR | 2003/07/31 15:00:00 |
| VOLUME A | NUMBER READ PER SEC | OFF | 2003/07/31 15:00:00 |
| VOLUME A | NUMBER WRITTEN PER SEC | OFF | 2003/07/31 15:00:00 |
| VOLUME A | TRANSFER RATE | HOUR | 2003/07/31 15:00:00 |
| VOLUME A | READ TRANSFER RATE | OFF | 2003/07/31 15:00:00 |
| VOLUME A | WRITE TRANSFER RATE | OFF | 2003/07/31 15:00:00 |
| VOLUME B | NUMBER OF I/O PER SEC | HOUR | 2003/07/31 15:00:00 |
| VOLUME B | NUMBER READ PER SEC | OFF | 2003/07/31 15:00:00 |
| VOLUME B | NUMBER WRITTEN PER SEC | OFF | 2003/07/31 15:00:00 |
| VOLUME B | TRANSFER RATE | HOUR | 2003/07/31 15:00:00 |
| VOLUME B | READ TRANSFER RATE | OFF | 2003/07/31 15:00:00 |
| VOLUME B | WRITE TRANSFER RATE | OFF | 2003/07/31 15:00:00 |
| VOLUME C | NUMBER OF I/O PER SEC | HOUR | 2003/07/31 15:00:00 |
| VOLUME C | NUMBER READ PER SEC | OFF | 2003/07/31 15:00:00 |
| VOLUME C | NUMBER WRITTEN PER SEC | OFF | 2003/07/31 15:00:00 |
| VOLUME C | TRANSFER RATE | HOUR | 2003/07/31 15:00:00 |
| VOLUME C | READ TRANSFER RATE | OFF | 2003/07/31 15:00:00 |
| VOLUME C | WRITE TRANSFER RATE | OFF | 2003/07/31 15:00:00 |
| PORT A | TRANSFER RATE | HOUR | 2003/07/31 15:00:00 |
| PORT A | READ TRANSFER RATE | OFF | 2003/07/31 15:00:00 |
| PORT A | WRITE TRANSFER RATE | OFF | 2003/07/31 15:00:00 |

METRICS VALUE TABLE — 1301

| 2003/07/31 13:00:00 | VOLUME A | NUMBER OF I/O PER SEC | 165.3 |
|---|---|---|---|
| 2003/07/31 13:00:00 | VOLUME A | TRANSFER RATE | 1,757.6 |
| 2003/07/31 13:00:00 | VOLUME B | NUMBER OF I/O PER SEC | 120.4 |
| 2003/07/31 13:00:00 | VOLUME B | TRANSFER RATE | 809.3 |
| 2003/07/31 13:00:00 | VOLUME C | NUMBER OF I/O PER SEC | 14.0 |
| 2003/07/31 13:00:00 | VOLUME C | TRANSFER RATE | 226.7 |
| 2003/07/31 13:00:00 | PORT A | TRANSFER RATE | 2,937.1 |
| 2003/07/31 14:00:00 | VOLUME A | NUMBER OF I/O PER SEC | 165.1 |
| 2003/07/31 14:00:00 | VOLUME A | TRANSFER RATE | 1,757.4 |
| 2003/07/31 14:00:00 | VOLUME B | NUMBER OF I/O PER SEC | 154.1 |
| 2003/07/31 14:00:00 | VOLUME B | TRANSFER RATE | 1,002.1 |
| 2003/07/31 14:00:00 | VOLUME C | NUMBER OF I/O PER SEC | 19.4 |
| 2003/07/31 14:00:00 | VOLUME C | TRANSFER RATE | 314.2 |
| 2003/07/31 14:00:00 | PORT A | TRANSFER RATE | 3,256.2 |
| 2003/07/31 15:00:00 | VOLUME A | NUMBER OF I/O PER SEC | 165.8 |
| 2003/07/31 15:00:00 | VOLUME A | TRANSFER RATE | 1,757.7 |
| 2003/07/31 15:00:00 | VOLUME B | NUMBER OF I/O PER SEC | 152.7 |
| 2003/07/31 15:00:00 | VOLUME B | TRANSFER RATE | 1,003.3 |
| 2003/07/31 15:00:00 | VOLUME C | NUMBER OF I/O PER SEC | 19.0 |
| 2003/07/31 15:00:00 | VOLUME C | TRANSFER RATE | 308.1 |
| 2003/07/31 15:00:00 | PORT A | TRANSFER RATE | 3,225.7 |
| 1302 | 1303 | 1304 | 1305 |

FIG. 14A

DB OBJECT-TABLE SPACE RELATION TABLE — 1401

| TABLE D | TABLE SPACE D |
|---|---|
| TABLE E | TABLE SPACE D |
| INDEX C | TABLE SPACE D |
| 1402 | 1403 |

FIG. 14B

TABLE SPACE-FILE RELATION TABLE — 1404

| TABLE SPACE D | FILE H |
|---|---|
| TABLE SPACE D | FILE I |
| TABLE SPACE D | FILE J |
| 1405 | 1406 |

FIG.15

PERFORMANCE DATA COLLECTION STATUS TABLE 1501

| | | | |
|---|---|---|---|
| TABLE D | NUMBER OF RECORDS INSERTED | OFF | 2003/07/31 15:00:00 |
| TABLE D | NUMBER OF RECORDS READ | OFF | 2003/07/31 15:00:00 |
| TABLE D | NUMBER OF RECORDS UPDATED | OFF | 2003/07/31 15:00:00 |
| TABLE D | NUMBER OF RECORDS DELETED | OFF | 2003/07/31 15:00:00 |
| TABLE E | NUMBER OF RECORDS INSERTED | OFF | 2003/07/31 15:00:00 |
| TABLE E | NUMBER OF RECORDS READ | OFF | 2003/07/31 15:00:00 |
| TABLE E | NUMBER OF RECORDS UPDATED | OFF | 2003/07/31 15:00:00 |
| TABLE E | NUMBER OF RECORDS DELETED | OFF | 2003/07/31 15:00:00 |
| INDEX C | NUMBER OF RECORDS INSERTED | OFF | 2003/07/31 15:00:00 |
| INDEX C | NUMBER OF RECORDS READ | OFF | 2003/07/31 15:00:00 |
| INDEX C | NUMBER OF RECORDS UPDATED | OFF | 2003/07/31 15:00:00 |
| INDEX C | NUMBER OF RECORDS DELETED | OFF | 2003/07/31 15:00:00 |
| TABLE SPACE D | NUMBER OF I/O PER SEC | HOUR | 2003/07/31 15:00:00 |
| TABLE SPACE D | NUMBER READ PER SEC | OFF | 2003/07/31 15:00:00 |
| TABLE SPACE D | NUMBER WRITTEN PER SEC | OFF | 2003/07/31 15:00:00 |
| TABLE SPACE D | TRANSFER RATE | HOUR | 2003/07/31 15:00:00 |
| TABLE SPACE D | READ TRANSFER RATE | OFF | 2003/07/31 15:00:00 |
| TABLE SPACE D | WRITE TRANSFER RATE | OFF | 2003/07/31 15:00:00 |
| 1502 | 1503 | 1504 | 1505 |

FIG.16

METRICS VALUE TABLE 1601

| 2003/07/31 13:00:00 | TABLE SPACE D | NUMBER OF I/O PER SEC | 10.9 |
|---|---|---|---|
| 2003/07/31 13:00:00 | TABLE SPACE D | TRANSFER RATE | 114.1 |
| 2003/07/31 14:00:00 | TABLE SPACE D | NUMBER OF I/O PER SEC | 12.9 |
| 2003/07/31 14:00:00 | TABLE SPACE D | TRANSFER RATE | 123.2 |
| 2003/07/31 15:00:00 | TABLE SPACE D | NUMBER OF I/O PER SEC | 10.3 |
| 2003/07/31 15:00:00 | TABLE SPACE D | TRANSFER RATE | 104.7 |

FILE-VOLUME RELATION TABLE 1701

| FILE H | VOLUME D |
|---|---|
| FILE I | VOLUME D |
| FILE J | VOLUME D |

VOLUME-LOGICAL VOLUME-PORT RELATION TABLE 1704

| VOLUME D | LOGICAL VOLUME D | PORT B | PORT P |
|---|---|---|---|

PERFORMANCE DATA COLLECTION STATUS TABLE 1801

| | | | |
|---|---|---|---|
| FILE H | NUMBER OF I/O PER SEC | OFF | 2003/07/31 15:00:00 |
| FILE H | NUMBER READ PER SEC | OFF | 2003/07/31 15:00:00 |
| FILE H | NUMBER WRITTEN PER SEC | OFF | 2003/07/31 15:00:00 |
| FILE H | TRANSFER RATE | OFF | 2003/07/31 15:00:00 |
| FILE H | READ TRANSFER RATE | OFF | 2003/07/31 15:00:00 |
| FILE H | WRITE TRANSFER RATE | OFF | 2003/07/31 15:00:00 |
| FILE I | NUMBER OF I/O PER SEC | OFF | 2003/07/31 15:00:00 |
| FILE I | NUMBER READ PER SEC | OFF | 2003/07/31 15:00:00 |
| FILE I | NUMBER WRITTEN PER SEC | OFF | 2003/07/31 15:00:00 |
| FILE I | TRANSFER RATE | OFF | 2003/07/31 15:00:00 |
| FILE I | READ TRANSFER RATE | OFF | 2003/07/31 15:00:00 |
| FILE I | WRITE TRANSFER RATE | OFF | 2003/07/31 15:00:00 |
| FILE J | NUMBER OF I/O PER SEC | OFF | 2003/07/31 15:00:00 |
| FILE J | NUMBER READ PER SEC | OFF | 2003/07/31 15:00:00 |
| FILE J | NUMBER WRITTEN PER SEC | OFF | 2003/07/31 15:00:00 |
| FILE J | TRANSFER RATE | OFF | 2003/07/31 15:00:00 |
| FILE J | READ TRANSFER RATE | OFF | 2003/07/31 15:00:00 |
| FILE J | WRITE TRANSFER RATE | OFF | 2003/07/31 15:00:00 |
| VOLUME D | NUMBER OF I/O PER SEC | HOUR | 2003/07/31 15:00:00 |
| VOLUME D | NUMBER READ PER SEC | OFF | 2003/07/31 15:00:00 |
| VOLUME D | NUMBER WRITTEN PER SEC | OFF | 2003/07/31 15:00:00 |
| VOLUME D | TRANSFER RATE | HOUR | 2003/07/31 15:00:00 |
| VOLUME D | READ TRANSFER RATE | OFF | 2003/07/31 15:00:00 |
| VOLUME D | WRITE TRANSFER RATE | OFF | 2003/07/31 15:00:00 |
| PORT B | TRANSFER RATE | HOUR | 2003/07/31 15:00:00 |
| PORT B | READ TRANSFER RATE | OFF | 2003/07/31 15:00:00 |
| PORT B | WRITE TRANSFER RATE | OFF | 2003/07/31 15:00:00 |
| 1802 | 1803 | 1804 | 1805 |

METRICS VALUE TABLE

| 2003/07/31 13:00:00 | VOLUME D | NUMBER OF I/O PER SEC | 10.9 |
| --- | --- | --- | --- |
| 2003/07/31 13:00:00 | VOLUME D | TRANSFER RATE | 114.1 |
| 2003/07/31 13:00:00 | PORT B | TRANSFER RATE | 117.7 |
| 2003/07/31 14:00:00 | VOLUME D | NUMBER OF I/O PER SEC | 12.9 |
| 2003/07/31 14:00:00 | VOLUME D | TRANSFER RATE | 123.2 |
| 2003/07/31 14:00:00 | PORT B | TRANSFER RATE | 127.4 |
| 2003/07/31 15:00:00 | VOLUME D | NUMBER OF I/O PER SEC | 10.3 |
| 2003/07/31 15:00:00 | VOLUME D | TRANSFER RATE | 104.7 |
| 2003/07/31 15:00:00 | PORT B | TRANSFER RATE | 108.2 |

INTER-PORT COMMUNICATION PATH TABLE

| PORT A | PORT N | {PORTS C, D, H, I} |
| --- | --- | --- |
| PORT A | PORT O | {PORTS C, E, J, L} |
| PORT B | PORT P | {PORTS F, G, K, M} |

PERFORMANCE DATA COLLECTION STATUS TABLE 2101

| PORT C | TRANSFER RATE | OFF | 2003/07/31 15:00:00 |
|---|---|---|---|
| PORT C | READ TRANSFER RATE | OFF | 2003/07/31 15:00:00 |
| PORT C | WRITE TRANSFER RATE | OFF | 2003/07/31 15:00:00 |
| PORT F | TRANSFER RATE | OFF | 2003/07/31 15:00:00 |
| PORT F | READ TRANSFER RATE | OFF | 2003/07/31 15:00:00 |
| PORT F | WRITE TRANSFER RATE | OFF | 2003/07/31 15:00:00 |
| ⋮ | ⋮ | ⋮ | ⋮ |

METRICS VALUE TABLE 2201

| – | – | – | – |
|---|---|---|---|

LOGICAL VOLUME-PARITY GROUP RELATION TABLE 2301

| LOGICAL VOLUME A | PARITY GROUP A |
|---|---|
| LOGICAL VOLUME B | PARITY GROUP A |
| LOGICAL VOLUME C | PARITY GROUP B |
| LOGICAL VOLUME D | PARITY GROUP B |

PERFORMANCE DATA COLLECTION STATUS TABLE 2401

| PORT N | TRANSFER RATE | OFF | 2003/07/31 15:00:00 |
|---|---|---|---|
| PORT N | READ TRANSFER RATE | OFF | 2003/07/31 15:00:00 |
| PORT N | WRITE TRANSFER RATE | OFF | 2003/07/31 15:00:00 |
| ⋮ | ⋮ | ⋮ | ⋮ |
| LOGICAL VOLUME A | NUMBER OF I/O PER SEC | HOUR | 2003/07/31 15:00:00 |
| LOGICAL VOLUME A | NUMBER READ PER SEC | OFF | 2003/07/31 15:00:00 |
| LOGICAL VOLUME A | NUMBER WRITTEN PER SEC | OFF | 2003/07/31 15:00:00 |
| LOGICAL VOLUME A | TRANSFER RATE | HOUR | 2003/07/31 15:00:00 |
| LOGICAL VOLUME A | READ TRANSFER RATE | OFF | 2003/07/31 15:00:00 |
| LOGICAL VOLUME A | WRITE TRANSFER RATE | OFF | 2003/07/31 15:00:00 |
| ⋮ | ⋮ | ⋮ | ⋮ |
| PARITY GROUP A | NUMBER OF I/O PER SEC | OFF | 2003/07/31 15:00:00 |
| PARITY GROUP A | NUMBER READ PER SEC | OFF | 2003/07/31 15:00:00 |
| PARITY GROUP A | NUMBER WRITTEN PER SEC | OFF | 2003/07/31 15:00:00 |
| PARITY GROUP A | TRANSFER RATE | OFF | 2003/07/31 15:00:00 |
| PARITY GROUP A | READ TRANSFER RATE | OFF | 2003/07/31 15:00:00 |
| PARITY GROUP A | WRITE TRANSFER RATE | OFF | 2003/07/31 15:00:00 |
| ⋮ | ⋮ | ⋮ | ⋮ |
| 2402 | 2403 | 2404 | 2405 |

FIG.25

METRICS VALUE TABLE
2501

| | | | |
|---|---|---|---|
| 2003/07/31 13:00:00 | LOGICAL VOLUME A | NUMBER OF I/O PER SEC | 165.3 |
| 2003/07/31 13:00:00 | LOGICAL VOLUME A | TRANSFER RATE | 1,757.6 |
| 2003/07/31 13:00:00 | LOGICAL VOLUME B | NUMBER OF I/O PER SEC | 120.4 |
| 2003/07/31 13:00:00 | LOGICAL VOLUME B | TRANSFER RATE | 809.3 |
| 2003/07/31 13:00:00 | LOGICAL VOLUME C | NUMBER OF I/O PER SEC | 14.0 |
| 2003/07/31 13:00:00 | LOGICAL VOLUME C | TRANSFER RATE | 226.7 |
| 2003/07/31 13:00:00 | LOGICAL VOLUME D | NUMBER OF I/O PER SEC | 10.9 |
| 2003/07/31 13:00:00 | LOGICAL VOLUME D | TRANSFER RATE | 114.1 |
| 2003/07/31 14:00:00 | LOGICAL VOLUME A | NUMBER OF I/O PER SEC | 165.1 |
| 2003/07/31 14:00:00 | LOGICAL VOLUME A | TRANSFER RATE | 1,757.4 |
| 2003/07/31 14:00:00 | LOGICAL VOLUME B | NUMBER OF I/O PER SEC | 154.1 |
| 2003/07/31 14:00:00 | LOGICAL VOLUME B | TRANSFER RATE | 1,002.1 |
| 2003/07/31 14:00:00 | LOGICAL VOLUME C | NUMBER OF I/O PER SEC | 19.4 |
| 2003/07/31 14:00:00 | LOGICAL VOLUME C | TRANSFER RATE | 314.2 |
| 2003/07/31 14:00:00 | LOGICAL VOLUME D | NUMBER OF I/O PER SEC | 12.9 |
| 2003/07/31 14:00:00 | LOGICAL VOLUME D | TRANSFER RATE | 123.2 |
| 2003/07/31 15:00:00 | LOGICAL VOLUME A | NUMBER OF I/O PER SEC | 165.8 |
| 2003/07/31 15:00:00 | LOGICAL VOLUME A | TRANSFER RATE | 1,757.7 |
| 2003/07/31 15:00:00 | LOGICAL VOLUME B | NUMBER OF I/O PER SEC | 125.7 |
| 2003/07/31 15:00:00 | LOGICAL VOLUME B | TRANSFER RATE | 1,003.3 |
| 2003/07/31 15:00:00 | LOGICAL VOLUME C | NUMBER OF I/O PER SEC | 19.0 |
| 2003/07/31 15:00:00 | LOGICAL VOLUME C | TRANSFER RATE | 308.1 |
| 2003/07/31 15:00:00 | LOGICAL VOLUME D | NUMBER OF I/O PER SEC | 10.3 |
| 2003/07/31 15:00:00 | LOGICAL VOLUME D | TRANSFER RATE | 104.7 |
| 2502 | 2503 | 2504 | 2505 |

FIG.26A

DB OBJECT-TABLE SPACE RELATION TABLE 2601

| TABLE A | TABLE SPACE A |
|---------|---------------|
| TABLE B | TABLE SPACE A |
| INDEX A | TABLE SPACE B |
| TABLE C | TABLE SPACE C |
| INDEX B | TABLE SPACE C |
| TABLE D | TABLE SPACE D |
| TABLE E | TABLE SPACE D |
| INDEX C | TABLE SPACE D |

TABLE SPACE-FILE RELATION TABLE 2604

| TABLE SPACE A | FILE A |
|---------------|--------|
| TABLE SPACE A | FILE B |
| TABLE SPACE A | FILE C |
| TABLE SPACE B | FILE D |
| TABLE SPACE B | FILE E |
| TABLE SPACE C | FILE F |
| TABLE SPACE C | FILE G |
| TABLE SPACE D | FILE H |
| TABLE SPACE D | FILE I |
| TABLE SPACE D | FILE J |

FILE-VOLUME RELATION TABLE 2701

| FILE A | VOLUME A |
|---|---|
| FILE B | VOLUME A |
| FILE C | VOLUME A |
| FILE D | VOLUME B |
| FILE E | VOLUME B |
| FILE F | VOLUME C |
| FILE G | VOLUME C |
| FILE H | VOLUME D |
| FILE I | VOLUME D |
| FILE J | VOLUME D |

LOGICAL VOLUME-PARITY GROUP RELATION TABLE 2704

| LOGICAL VOLUME A | PARITY GROUP A |
|---|---|
| LOGICAL VOLUME B | PARITY GROUP A |
| LOGICAL VOLUME C | PARITY GROUP B |
| LOGICAL VOLUME D | PARITY GROUP B |

VOLUME-LOGICAL VOLUME-PORT CORRESPONDENCE TABLE 2801

| VOLUME A | LOGICAL VOLUME A | PORT A | PORT N | {PORTS C, D, H, I} |
|---|---|---|---|---|
| VOLUME B | LOGICAL VOLUME B | PORT A | PORT N | {PORTS C, D, H, I} |
| VOLUME C | LOGICAL VOLUME C | PORT A | PORT O | {PORTS C, E, J, L} |
| VOLUME D | LOGICAL VOLUME D | PORT B | PORT P | {PORTS F, G, K, M} |

PERFORMANCE DATA COLLECTION STATUS TABLE 121

| TABLE A | NUMBER OF RECORDS INSERTED | OFF | 2003/07/31 15:00:00 |
|---|---|---|---|
| ⋮ | ⋮ | ⋮ | ⋮ |
| TABLE SPACE A | NUMBER OF I/O PER SEC | HOUR | 2003/07/31 15:00:00 |
| ⋮ | ⋮ | ⋮ | ⋮ |
| FILE A | NUMBER OF I/O PER SEC | OFF | 2003/07/31 15:00:00 |
| ⋮ | ⋮ | ⋮ | ⋮ |
| VOLUME A | NUMBER OF I/O PER SEC | HOUR | 2003/07/31 15:00:00 |
| ⋮ | ⋮ | ⋮ | ⋮ |
| PORT A | TRANSFER RATE | HOUR | 2003/07/31 15:00:00 |
| ⋮ | ⋮ | ⋮ | ⋮ |
| TABLE D | NUMBER OF RECORDS INSERTED | OFF | 2003/07/31 15:00:00 |
| ⋮ | ⋮ | ⋮ | ⋮ |
| TABLE SPACE D | NUMBER OF I/O PER SEC | HOUR | 2003/07/31 15:00:00 |
| ⋮ | ⋮ | ⋮ | ⋮ |
| FILE H | NUMBER OF I/O PER SEC | OFF | 2003/07/31 15:00:00 |
| ⋮ | ⋮ | ⋮ | ⋮ |
| VOLUME D | NUMBER OF I/O PER SEC | HOUR | 2003/07/31 15:00:00 |
| ⋮ | ⋮ | ⋮ | ⋮ |
| PORT B | TRANSFER RATE | HOUR | 2003/07/31 15:00:00 |
| ⋮ | ⋮ | ⋮ | ⋮ |
| PORT C | TRANSFER RATE | OFF | 2003/07/31 15:00:00 |
| ⋮ | ⋮ | ⋮ | ⋮ |
| PORT N | TRANSFER RATE | OFF | 2003/07/31 15:00:00 |
| ⋮ | ⋮ | ⋮ | ⋮ |
| LOGICAL VOLUME A | NUMBER OF I/O PER SEC | HOUR | 2003/07/31 15:00:00 |
| ⋮ | ⋮ | ⋮ | ⋮ |
| PARITY GROUP A | NUMBER OF I/O PER SEC | OFF | 2003/07/31 15:00:00 |
| ⋮ | ⋮ | ⋮ | ⋮ |
| 2901 | 2902 | 2903 | 2904 |

FIG.30

METRICS VALUE TABLE 127

| 2003/07/31 13:00:00 | TABLE SPACE A | NUMBER OF I/O PER SEC | 16.53 |
|---|---|---|---|
| 2003/07/31 13:00:00 | TABLE SPACE A | TRANSFER RATE | 175.76 |
| 2003/07/31 13:00:00 | TABLE SPACE B | NUMBER OF I/O PER SEC | 12.04 |
| 2003/07/31 13:00:00 | TABLE SPACE B | TRANSFER RATE | 80.93 |
| ⋮ | ⋮ | ⋮ | ⋮ |
| 2003/07/31 13:00:00 | LOGICAL VOLUME C | NUMBER OF I/O PER SEC | 1.40 |
| 2003/07/31 13:00:00 | LOGICAL VOLUME C | TRANSFER RATE | 22.67 |
| 2003/07/31 13:00:00 | LOGICAL VOLUME D | NUMBER OF I/O PER SEC | 0.00 |
| 2003/07/31 13:00:00 | LOGICAL VOLUME D | TRANSFER RATE | 0.00 |
| 2003/07/31 14:00:00 | TABLE SPACE A | NUMBER OF I/O PER SEC | 16.51 |
| 2003/07/31 14:00:00 | TABLE SPACE A | TRANSFER RATE | 175.74 |
| 2003/07/31 14:00:00 | TABLE SPACE B | NUMBER OF I/O PER SEC | 15.41 |
| 2003/07/31 14:00:00 | TABLE SPACE B | TRANSFER RATE | 100.21 |
| ⋮ | ⋮ | ⋮ | ⋮ |
| 2003/07/31 14:00:00 | LOGICAL VOLUME C | NUMBER OF I/O PER SEC | 1.94 |
| 2003/07/31 14:00:00 | LOGICAL VOLUME C | TRANSFER RATE | 31.42 |
| 2003/07/31 14:00:00 | LOGICAL VOLUME D | NUMBER OF I/O PER SEC | 0.00 |
| 2003/07/31 14:00:00 | LOGICAL VOLUME D | TRANSFER RATE | 0.01 |
| 2003/07/31 15:00:00 | TABLE SPACE A | NUMBER OF I/O PER SEC | 16.58 |
| 2003/07/31 15:00:00 | TABLE SPACE A | TRANSFER RATE | 175.77 |
| 2003/07/31 15:00:00 | TABLE SPACE B | NUMBER OF I/O PER SEC | 15.27 |
| 2003/07/31 15:00:00 | TABLE SPACE B | TRANSFER RATE | 100.33 |
| ⋮ | ⋮ | ⋮ | ⋮ |
| 2003/07/31 15:00:00 | LOGICAL VOLUME C | NUMBER OF I/O PER SEC | 1.90 |
| 2003/07/31 15:00:00 | LOGICAL VOLUME C | TRANSFER RATE | 30.81 |
| 2003/07/31 15:00:00 | LOGICAL VOLUME D | NUMBER OF I/O PER SEC | 1.03 |
| 2003/07/31 15:00:00 | LOGICAL VOLUME D | TRANSFER RATE | 10.47 |
| 3001 | 3002 | 3003 | 3004 |

FIG.31

COLLECTION STATUS UPDATE RULE TABLE 3101

| TABLE SPACE A | NUMBER OF I/O PER SEC | 11 | 1 | {800} | TABLE SPACE A | 4 | * | MINUTE | 2 |
|---|---|---|---|---|---|---|---|---|---|
| : | : | : | : | : | : | : | : | : | : |
| PORT A | TRANSFER RATE | 23 | 1 | {20,000} | PORT A | 4 | * | MINUTE | 2 |
| : | : | : | : | : | : | : | : | : | : |

DEFAULT PERFORMANCE DATA COLLECTION STATUS TABLE 3201

| TABLE SPACE A | NUMBER OF I/O PER SEC | HOUR |
|---|---|---|
| TABLE SPACE A | TRANSFER RATE | HOUR |
| TABLE SPACE B | NUMBER OF I/O PER SEC | HOUR |
| TABLE SPACE B | TRANSFER RATE | HOUR |
| TABLE SPACE C | NUMBER OF I/O PER SEC | HOUR |
| TABLE SPACE C | TRANSFER RATE | HOUR |
| : | : | : |

UPDATE RULE ACTIVATION STATUS TABLE 3301

| 23 | TABLE A | NUMBER OF RECORDS INSERTED | MINUTE |
|---|---|---|---|
| 23 | TABLE A | NUMBER OF RECORDS READ | MINUTE |
| 23 | TABLE A | NUMBER OF RECORDS UPDATED | MINUTE |
| 23 | TABLE A | NUMBER OF RECORDS DELETED | MINUTE |
| : | : | : | : |

3302 3303  3304  3305

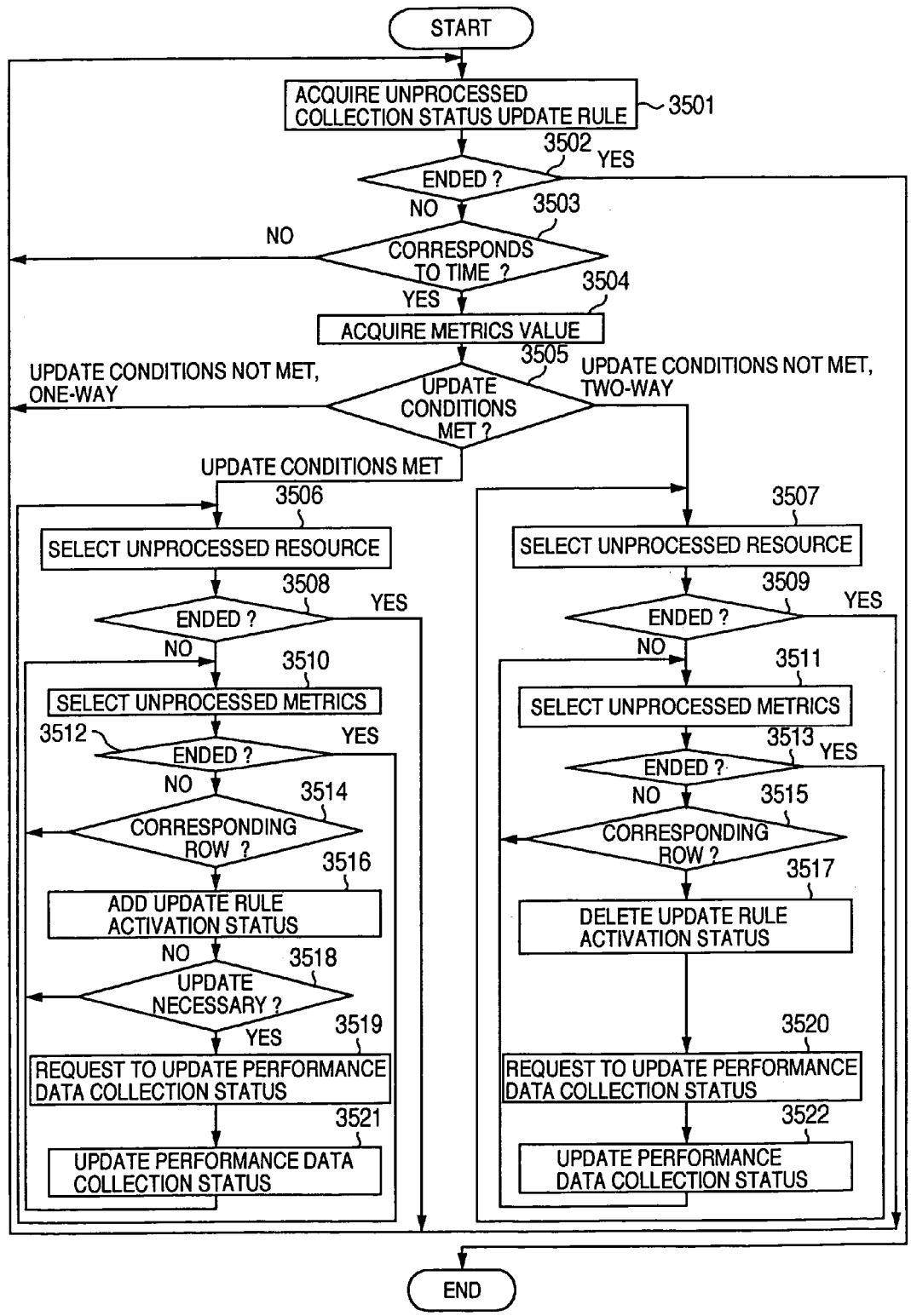

METHOD AND PROGRAM OF COLLECTING PERFORMANCE DATA FOR STORAGE NETWORK

BACKGROUND OF THE INVENTION

The present invention relates to a method and a system for collecting the performance data of hardware devices constituting a storage network and the software operated in the hardware devices, or in particular a method and a system for collecting the storage network performance data suitable to a case in which the network is increased in scale to such an extent that the component elements for which the performance data are to be collected are vast in number.

A storage network so configured that a centralized storage is accessed from a plurality of host servers through the network is extending widely as an architecture for a data center to improve the utilization rate and reduce the management cost of the storage ever on the increase in scale.

The performance management software meets this situation by being configured of an agent arranged in a network for each hardware device or software for which the performance is to be monitored, and the management software for centrally managing the performance data for the whole network. Each agent acquires the performance data by direct communication with each object to be monitored, while the management software collects and accumulates the performance data acquired by the agents and supplies the performance data in response to a request of a storage network manager or the like.

Apart from the storage network, take a computer network as an example. A method and a system having a similar configuration to the above-mentioned method and system for monitoring the performance of a plurality of server devices in a network environment are disclosed in U.S. Pat. No. 6,505,248.

With the extension of the centralized storage based on a storage network, the component elements of the network increased in scale has become vast in number and the correlation between the component elements tends to be complicated more and more.

In order to monitor the performance of an application system and carries out the tuning in this storage network environment, the performance data for various hardware devices and software making up the network are required to be comprehensively collected and the correlation between them and the temporal change thereof are required to be grasped.

A technique for automating the collection of the dispersed performance data is indispensable for the performance management of this kind of the storage network. With a further increase expected in the scale of the network, however, automatic comprehensive collection of the performance data for all the component elements of the network may become considerably difficult in terms of the processing capacity including the storage capacity, computation performance and the communication performance.

In order to monitor and tune the performance of an application system in a large storage network environment, it is necessary to collect the performance data on the various hardware devices and software making up the network comprehensively and to grasp the correlation between them and the temporal change thereof.

This is by reason of the fact that unlike in the conventional architecture in which each application system is independently associated with a corresponding server with a computer processing system and an external storage connected directly to each other, the storage network environment is liable to develop an interference in performance between application systems at a portion shared by the network devices and the storage systems.

In some conventional techniques, the collecting operation for the performance data can be switched on/off for each network component element by manual updating operation of the user. The use of this function could limit the amount of the performance data to be collected. For this purpose, however, elements to be emphasized and elements to be ignored are required to be discriminated from each other in advance.

This is a considerably tough job for a storage network environment in which various applications having different tendencies of the performance load are unified and a vast number of component elements affect each other in complicated way. Also, the manual operation of the user may cause the timing of acquiring crucial information to be lost or a problem, if any, to be detected too late.

SUMMARY OF THE INVENTION

The object of this invention is to provide a method of collecting the storage network performance data which solves the problem described above.

In order to achieve this object, according to one aspect of this invention, there is provided a method of collecting the performance data for each of the devices constituting a storage network and the software operated on the devices, wherein the range or degree of data collection is adjusted as required based on the performance data collected. The devices constituting the storage network include one or a plurality of computer systems, one or a plurality of external storages and one or a plurality of network systems for transmitting/receiving input/output data between the computer systems and the external storages.

According to another aspect of the invention, there is provided a method of collecting the performance data for a storage network including at least a computer, at least a storage and at least a network system for transmitting/receiving the input/output data between the computer and the storage, wherein the performance data are collected from at least one of the computer, the storage and the network system, and the range or frequency of collecting the performance data is updated based on the performance data collected and the conditions set for collection of the performance data.

Other objects, features and advantages of the invention will become apparent from the following description of the embodiments of the invention taken in conjunction with the accompanying drawings.

BRIEF DESCRIPTION OF THE DRAWINGS

FIGS. 8A and 8B are a diagram showing an example of the table configuration and the table structure of a related resources information storage used by a database performance data collection agent of a server A.

FIG. 9 is a diagram showing an example of the structure of a performance data collection status table used by the database performance data collection agent of the server A.

FIG. 10 is a diagram showing an example of the structure of the metrics value table used by the database performance data collection agent of the server A.

FIGS. 11A and 11B are a diagram showing an example of the table configuration and the table structure of a related resources information storage used by the host performance data collection agent of the server A.

FIG. 12 is a diagram showing an example of the structure of the performance data collection status table used by the host performance data collection agent of the server A.

FIG. 13 is a diagram showing an example of the structure of the metrics value table used by the host performance data collection agent of the server A.

FIGS. 14A and 14B are a diagram showing an example of the table configuration and the table structure of the related resources information storage used by the database performance data collection agent of a server B.

FIG. 15 is a diagram showing an example of the structure of the performance data collection status table used by the database performance data collection agent of the server B.

FIG. 16 is a diagram showing an example of the structure of the metrics value table used by the database performance data collection agent of the server B.

FIGS. 17A and 17B are a diagram showing an example of the table configuration and the table structure of the related resources information storage used by the host performance data collection agent of the server B.

FIG. 18 is a diagram showing an example of the structure of the performance data collection status table used by the host performance data collection agent of the server B.

FIG. 19 is a diagram showing an example of the structure of the metrics value table used by the host performance data collection agent of the server B.

FIG. 20 is a diagram showing an example of the table configuration and the table structure of the related resources information storage used by a SAN switch performance data collection agent.

FIG. 21 is a diagram showing an example of the structure of the performance data collection status table used by the SAN switch performance data collection agent.

FIG. 22 is a diagram showing an example of the structure of the metrics value table used by the SAN switch performance data collection agent.

FIG. 23 is a diagram showing an example of the table configuration and the table structure of the related resources information storage used by a subsystem performance data collection agent.

FIG. 24 is a diagram showing an example of the structure of the performance data collection status table used by the subsystem performance data collection agent.

FIG. 25 is a diagram showing an example of the structure of the metrics value table used by the subsystem performance data collection agent.

FIGS. 26A and 26B are a first portion of a diagram showing an example the table configuration and the table structure of the related resources information storage used by the storage network performance management software.

FIGS. 27A and 27B are a second portion of a diagram showing an example the table configuration and the table structure of the related resources information storage used by the storage network performance management software.

FIG. 28 is a third portion of a diagram showing an example the table configuration and the table structure of the related resources information storage used by the storage network performance management software.

FIG. 29 is a diagram showing an example of the structure of the performance data collection table used by the storage network performance management software.

FIG. 30 is a diagram showing an example of the structure of the metrics value table used by the storage network performance management software.

FIG. 31 is a diagram showing an example of the structure of a collection status update rule table.

FIG. 32 is a diagram showing an example of the structure of a default performance data collection status table.

FIG. 33 is a diagram showing an example of the structure of an update rule activation status table.

FIG. 35 is a flowchart showing the steps of the collection status update process of the storage network performance management software.

DESCRIPTION OF THE EMBODIMENTS

An embodiment of the invention will be explained below with reference to the drawings.

Figure 1:
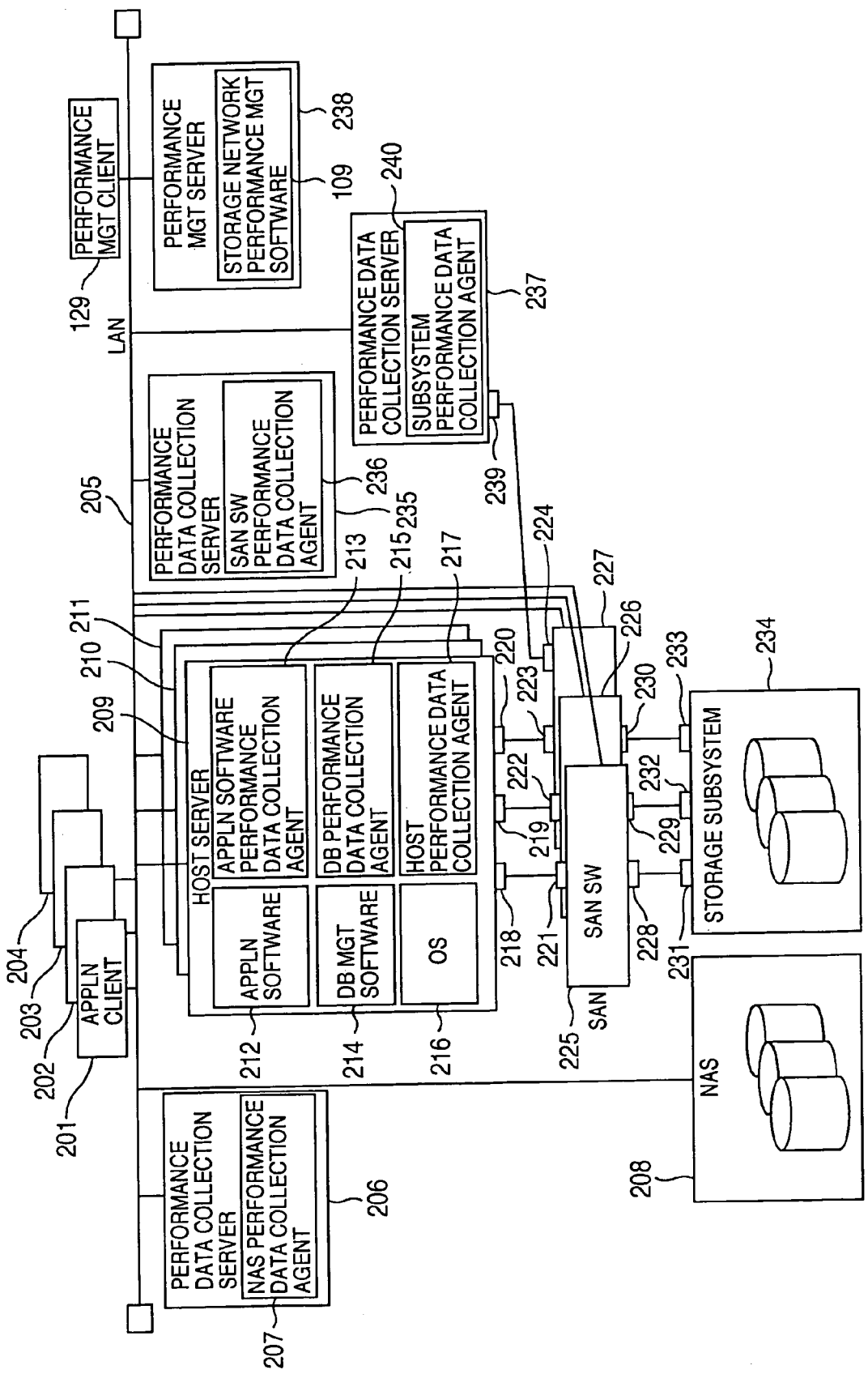
FIG. 1 is a block diagram showing an embodiment of the invention.

FIG. 1 is a diagram showing a system configuration according to an embodiment of the invention. The hardware constituting an application system on the basis of a storage network includes application clients 201 to 204, a local area network (LAN) 205, host servers 209 to 211, storage area network (SAN) switches 225 to 227, a storage subsystem 234 and a network attached storage (NAS) 208. The software, on the other hand, includes the application software 212, the database (DB) management software 214 and the operating system (OS) 216. The storage subsystem is defined as a storage including a plurality of storage media such as hard disks and a controller for controlling the storage media according to the RAID (redundant array of independent disks) scheme.

The application clients 201 to 204 include devices such as personal computers, work stations and thin client terminals for providing the user interface function of an application system, and establish communication with the application software 212, etc. of the host servers 209 to 211 through the LAN 205. The application clients 201 to 204 may be portable terminals or the like having the function of transmitting/receiving data.

The application software 212 is for providing the application logic function of an application system, and in response to a processing request from the application clients 201 to 204, requests the database management software 214 to access and update the data as required. The database management software 214 is for providing the data management function of an application system, and in response to a request from the application software 212, executes the process for definition, operation and management of the data stored in the storage subsystem 234 and the NAS 208.

The application software 212 and the database management software 214 used by the application software 212 may be operated by either the same host server or different host servers. The data in the storage subsystem 234 is accessed from the database management software 214 through an operating system 216, host bus adaptor ports 218 to 220, host-side ports 221 to 223 of SAN switches, the SAN switches 225 to 227, storage-side ports 228 to 230 of the SAN switches and ports 231 to 233 of the storage subsystem. On the other hand, the data of the NAS 208 are accessed from the database management software 214 through the operating system 216 and the LAN 205.

The hardware constituting a system for performance management of a storage network and an application system include a performance management client 129, a performance management server 240 and performance data collection servers 206, 235, 237. The software, on the other hand, include storage network performance management software 109, an application software performance data collection agent 213, a database performance data collection agent 215, a host performance data collection agent 217, a subsystem performance data collection agent 238, a NAS performance data collection agent 207 and a SAN switch performance data collection agent 236.

The performance management client 129 is a device for providing the user interface function of the storage network performance management software 109, and communicates with the storage network performance management software 109 of the performance management server 240 through the LAN 205. A configuration in which a general-purpose personal computer is used as the performance management client 129, and the Web browser software operating on this personal computer constitutes a specific user interface is a typical example. In this configuration, the Web server software is operated on the computer used as the performance management server 240, and the performance data collected by the storage network management software 109 and the data required for turning are sent to the Web browser by HTTP (Hyper Text Transfer Protocol) through the Web server software and displayed on the screen.

The storage network performance management software 109 provides the function of collecting and analyzing the storage network performance data, and in order to acquire the performance data from the various software and hardware making up the network, uses dedicated performance data collection agent software for each hardware or software. The agents can be configured and arranged in any of various ways, one of which is explained below as an example. According to this embodiment, a dedicated agent (program) is used as an example, although other methods may be employed with equal effect.

The storage network performance management software 109 receives the data input by the user from the program operated at the performance management client 129 and provides the result of analysis of the performance data. Also, the storage network performance management software 109 transmits instructions and various commands to other programs (various agents, etc.) to collect the performance data. Further, the storage network performance management software 109 manages the configuration information and the collection status of the performance data and analyzes the performance thereof. These functions will be explained in detail later with reference to FIG. 2.

The application software performance data collection agent 213 and the database performance data collection agent 215 are programs for acquiring the performance data on the application software 212 and the database management software 214, respectively. The host performance data collection agent 217 acquires the performance data on the host server 209, the operating system 216 and the host bus adaptor ports 218 to 220. The subsystem performance data collection agent 238 acquires the performance data on the storage subsystem 234 and the ports 231 to 233 thereof through the host bus adaptor port 239 and the SAN switches.

The NAS performance data collection agent 207 acquires the performance data on the NAS 208 through the LAN 205. The SAN switch performance data collection agent 236 also acquires the performance data on the SAN switches 225 to 227 and the ports 221 to 223 and 228 to 230 thereof through the LAN 205. The subsystem performance data collection agent 238, the NAS performance data collection agent 297 and the SAN switch performance data collection agent 236 may be operated either by dedicated performance data collection servers, respectively, or by the same server. In either case, communication is carried out with the storage network performance management software 109 through the LAN 205.

Figure 2:
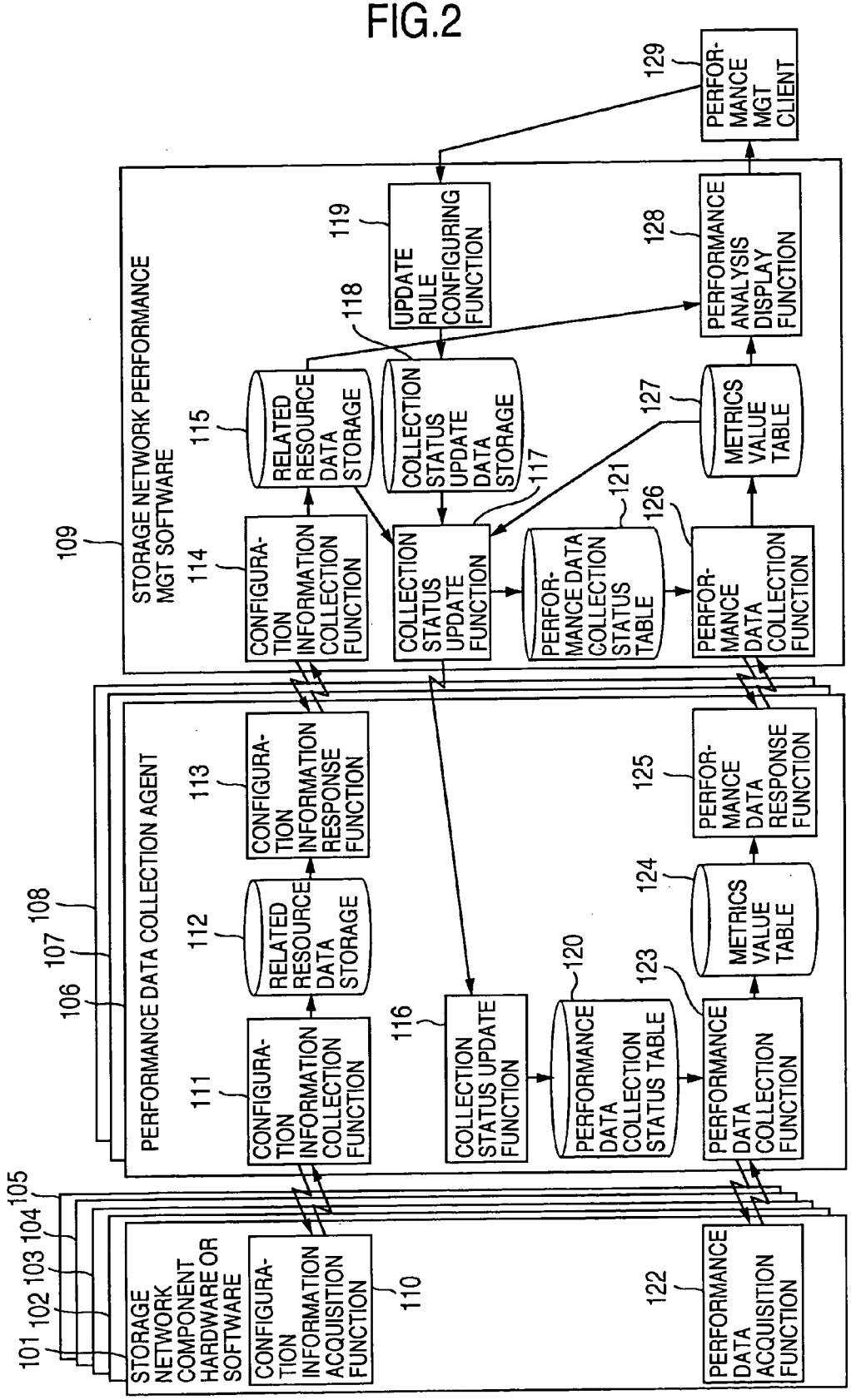
FIG. 2 is a diagram showing a system configuration according to an embodiment of the invention.

FIG. 2 is a block diagram showing a configuration according to an embodiment of the invention. Storage network component hardware or software 101 to 105 constitute the hardware or software of which the performance is monitored in the storage network. The storage network component hardware or software 101 to 105 shown in FIG. 2 correspond to any one of the host servers 209 to 211, the host bus adaptor ports 218 to 220, the application software 212, the database management software 214, the operating system 216, the storage subsystem 234 and the ports 231 to 233 thereof, the NAS 208, the SAN switches 225 to 227 and the ports 221 to 224 and 228 to 230 thereof shown in FIG. 1.

The performance data collection agents 106 to 108 shown in FIG. 2 are the software for acquiring the performance data from the storage network component hardware or software 101 to 105. The performance data collection agents 106 to 108 correspond to any one of the application software performance data collection agent 213, the database performance data collection agent 215, the host performance data collection agent 217, the subsystem performance data collection agent 238, the NAS performance data collection agent 207 and the SAN switch performance data collection agent 236 shown in FIG. 1.

The performance data of the storage network are collected and monitored in the manner described below. The performance data collector 123 of the performance data collection agent 106 is activated periodically by a timer in accordance with the schedule set by each agent or in response to a request of the storage network performance management software 109. The performance data collector 123, upon activation, accesses the performance data collection status table 120 and checks the collection status such as the advisability, frequency and the last date and time of collection for the performance items of the storage network component hardware or software in charge of the agent 106.

The individual performance items of the network component elements that can be candidates for performance monitor are called the metrics. Examples of the metrics include the CPU utilization rate, the memory usage rate, the storage I/O frequency, the storage I/O busy rate, the transfer rate and the throughput, the buffer hit ratio and the number of times the records are inserted, updated and deleted for the database management software, the response time of the Web servers, the available capacity, the utilization rate, the input/output data amount, the utilization time of the file systems and the disks, the number of errors of the network interfaces, the buffer overflow and the frame error.

The performance data collector 123, based on the result of checking the collection status of the performance data, requests the transmission of a measurement from the storage network component hardware or software performance data acquirer 122 capable of measuring the metrics to be collected. The metrics values transmitted from the performance data acquirer 122 in response to this request are stored in the metrics value table 124 by the performance data collector 123.

Similarly, the performance data collector 126 of the storage network performance management software 109 is periodically activated in accordance with a set schedule. The performance data collector 126, upon activation, searches the performance data collection status table 121 for the collection status of all the metrics in the network, and requests the performance data responder 125 of the corresponding performance data collection agent 106 to transmit a metrics value to be collected. The performance data responder 125 that has received the request to transmit the metrics value retrieves the requested metrics value from the metrics value table 124, and transmits it to the performance data collector 126. The metrics value transmitted from the performance data responder 125 is stored in the metrics value table 127 by the performance data collector 126.

The performance analysis display 128 of the storage network performance management software 109, in response to the request of the performance management client 129, retrieves and sends back a metrics value from the metrics value table 127. The performance analysis display 128, to meet the performance analysis request, may utilize the relation between the network component elements. The information on the relation between the network component elements is retrieved from the related resource information storage 115 by the performance analysis display 128.

The component elements of the storage network which constitute a unit for acquiring a cluster of metrics values is called a resource. A specific example of the resource and the relation between the resources is explained later with reference to FIG. 3. Also, a specific example of the screen displayed by the performance analysis display 128 on the performance management client 129 is explained later with reference to FIGS. 4 and 5. Further, the processing steps in the performance data collector 123 and the performance data collector 126 are explained in detail with reference to FIG. 34.

The related resources information are collected, like the performance data, in the following manner. The configuration information collector 111 of the performance data collection agent 106 is activated periodically according to a set schedule or at the request of the storage network performance management software 109. The configuration information collector 111, upon activation, requests the transmission of the related resources information from the storage network component hardware or software configuration information acquirer 110 in charge of the agent associated with it, receives the requested information, and stores the received information in the related resources information storage 112. The data from the various devices may be acquired by use of iSNS (Internet Storage Name Server). The device status, on the other hand, may be acquired by use of ESI (Entity Status Inquiry). The data on the devices making up the storage network may be acquired also by other methods.

The configuration information collector 114 of the storage network performance management software 109 is activated periodically by a set schedule. The configuration information collector 114, upon activation, requests the configuration information responders 113 of all the performance data collection agents of the network (or the configuration information responder 113 included in an agent communicable with the configuration information collector 114) to transmit the related resources information collected by each agent. The configuration information collector 114, upon receipt of the requested data retrieved from the related resources information storage 112, stores the received information in the related resources information storage 115.

The method of collecting the performance data is updated in the following way. Specifically, the collection status updater 117 of the storage network performance management software 109 is activated with the periodic interruption at a timing set by scheduling or the updating of the metrics value table 127 as a motive. The collection status updater 117, upon activation, determines a method of updating the collection method with reference to the collection status update information storage 118, the related resources information storage 115 and the metrics value table 127, and in accordance with this determination, updates the performance data collection status table 121, while at the same time requesting the collection status updater 116 of the performance data collection agent 106 to update the performance data collection status table 120.

The update rule configurer 119 of the storage network performance management software 109, at the request of the performance management client 129, updates the contents of the collection status update information storage 118 to change the method of collecting the performance data. A specific example of the screen displayed by the update rule configurer 119 at the performance management client 129 is explained with reference to FIGS. 6 and 7. The processing steps in the collection status updater 117 of the storage network performance management software 109 are explained in detail later with reference to FIG. 35.

Figure 3:
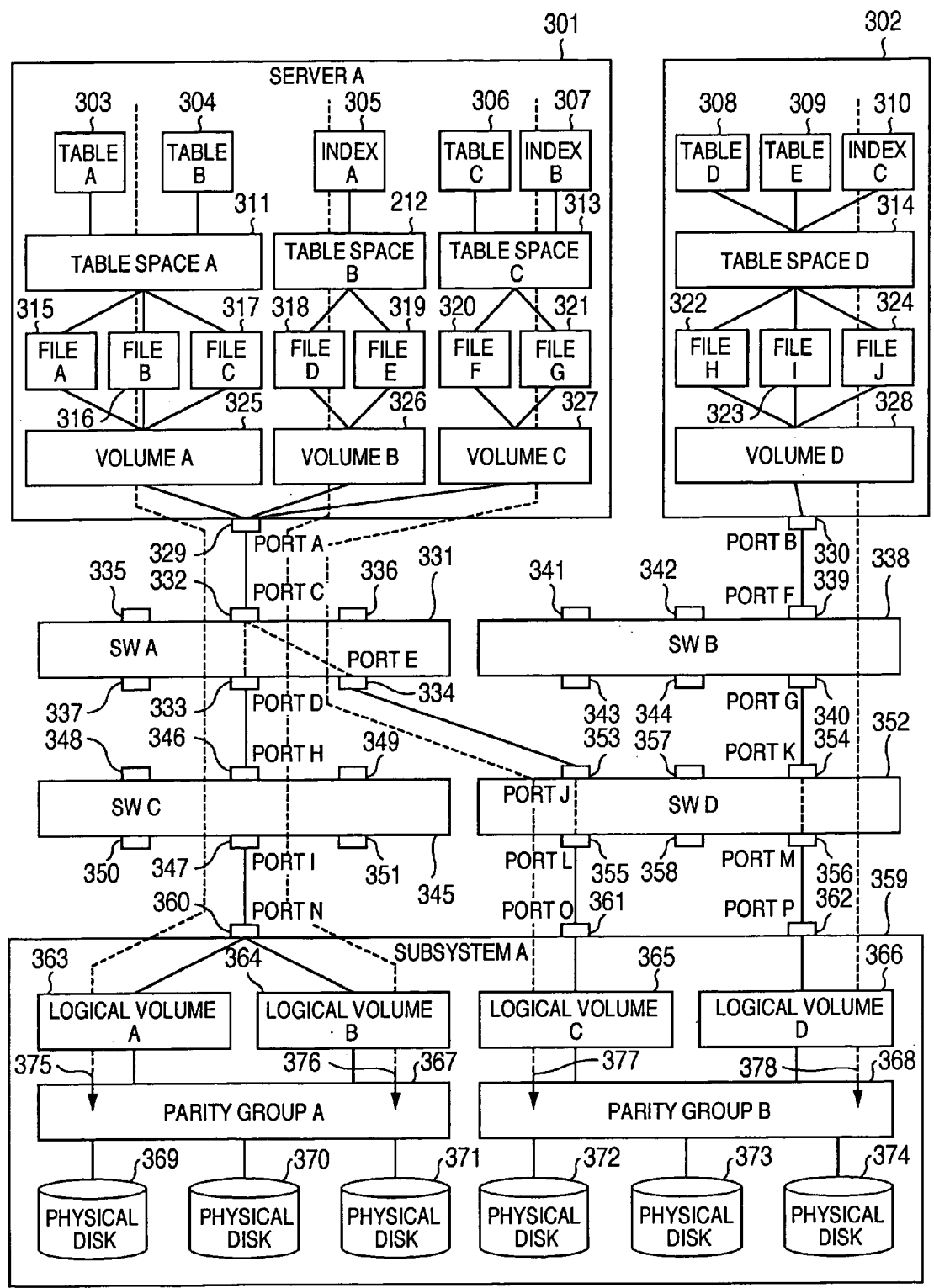
FIG. 3 is a diagram showing a specific example of resources and the interdependency relation between the resources in respect of performance.

FIG. 3 is a diagram showing a specific example of resources and the interdependency relation of performance between the resources. The resource is a component element of the network for which a cluster of metrics values can be acquired as an appropriate unit in monitoring the performance of the storage network. Various types of resources are available for each of specific hardware devices and software making up the storage network. The resources in a storage network affect each other in respect of performance.

The hardware of the storage network shown in FIG. 3 is configured of two host servers including a server A (301) and a server B (302), four SAN switches including a switch A (331), a switch B (338), a switch C (345) and a switch D (352), and one storage subsystem including a subsystem A (359).

In the server A, in order to acquire the performance data of the database management software, the server hardware and the operating system, assume that a corresponding database performance data collection agent and a corresponding host performance data collection agent are operated. The table A (303), the table B (304), the table C (306), the index A (305), the index B (307), the table space A (311), the table space B (312) and the table space C (313) are managed by the database management software, and constitute an example of the resources for which the data are acquired by the database performance data collection agent. In other words, the table, the index and the table space are related to each other for database performance evaluation and handled as a group.

The table is the very data conforming with the expression format of the relational database management software, while the index is the data for increasing the speed of table search. The table space, on the other hand, is a logical unit indicating an area for storing tables and indexes in the database management software.

In FIG. 3, the lines connecting the table A and the table B to the table space A, for example, indicate the relation in which the table A and the table B are stored in the table space A. This relation also represents the performance interdependency relation in which the load imposed when the application software accesses or updates the table A or the table B also causes a load for reading from or writing in the table space A. In other words, the operation of the database management software to access and update a table gives rise to the requirement of the operation of accessing a table space. In this case, an increase in the input/output operation by accessing the table increases the input/output operation for the table space, thereby increasing the load of the input/output operation for the table space.

The files A (315) to G (321), the volumes A (325) to C (327) and the port A (329) are an example of the resources on which the data are to be acquired by the host performance data collection agent. The file is a unit of the data input/output service provided by the operating system, and the volume is an area, managed by the operating system, in an external storage where the file is stored. Like the interdependency relation between the table and the table space, a file is assigned for table space storage, and a volume is assigned for file storage. Therefore, these resources have a perfomance interdependency relation with each other. In the case of FIG. 3, the table space A is stored in the files A to C, which in turn are stored in the volume A. Therefore, the interdependency relation exists between the table space A and the files A to C on the one hand and between the files A to C and the volume A on the other.

Assume that the database performance data collection agent and the host performance data collection agent are operated also in the server B. The resources for which the data are to be acquired by the database performance data collection agent of the server B include a table D (308), a table E (309), an index C (310) and a table space D (314), while the resources for which the data are to be acquired by the host performance data collection agent of the server B include a file H (322), a file I (323), a file J (324), a volume D (328) and a port B (330).

Assume that the SAN switch performance data collection agent is operating to acquire the performance data of the switches A to D. The resources for which the data are to be acquired by this agent include a port C (332), a port D (333), a port E (334), other ports (335 to 337) of the switch A, a port F (339), a port G (340), other ports (341 to 344) of the switch B, a port H (346), a port I (347), other ports (348 to 351) of the switch C, a port J (353), a port K (354), a port L (355), a port M (356) and other ports (357, 358) of the switch D.

Assume that the subsystem performance data collection agent is operating to acquire the performance data of the subsystem A. The resources for which the data are to be acquired by this agent include a port N (360), a port 0 (361), a port P (362), a logical volume A (363), a logical volume B (364), a logical volume C (365), a logical volume D (366), a parity group A (367), a parity group B (368) and physical disks (369 to 374).

The parity group is configured of a plurality of hard disk drives which appear to be a logically single fast and reliable disk drive due to the functions of the storage subsystem. The logical value, on the other hand, is such that a single parity group is divided by the functions of the storage subsystem thereby giving the appearance of a logical disk drive of a size meeting the application of the host server.

The volume of the host server is assigned to the logical volume of the storage subsystem, the logical volume is assigned to the parity group, and the parity group is assigned to the physical disk. Thus, the performance interdependency relation exists between these resources are. Once a pair of the volume of the host server and the logical volume of the storage subsystem assigned the same volume is determined, the path from the port of the host bus adaptor to the port of the storage subsystem through the ports of the SAN switches is determined as a distribution path of the input/output data exchanged between these volumes. Thus, the input/output load imposed on the volume of the host server constitutes a communication load imposed on the ports along the path. Therefore, the performance interdependency relation exists between the pair of the volume and the logical volume on the one hand and the ports along the path on the other.

In the case of FIG. 3, the volume A is assigned to the logical volume A, the logical volume A to the parity group A, and the parity group A to the physical disks 369 to 371. The pair of the volume A and the logical volume A corresponds to the path including the ports A, C, D, H, I and N in that order. Thus, the performance interdependency relation exists between these resources.

Figures 4, 5:
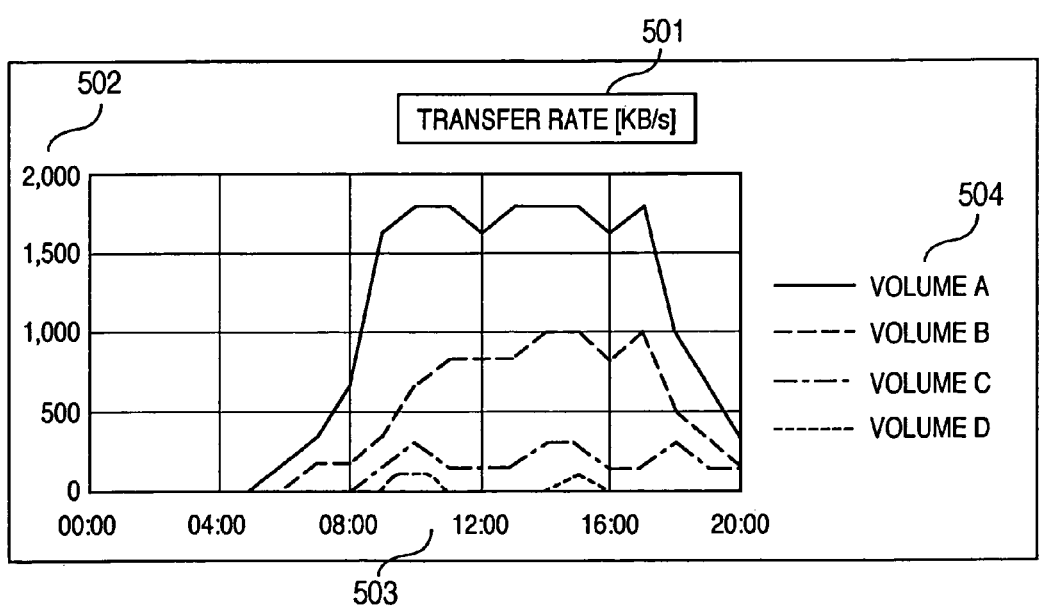
FIG. 4 is a diagram showing an example of a performance data display screen in table form.
FIG. 5 is a diagram showing an example of a performance data display screen in graph form.

FIG. 4 shows an example of the screen for displaying the performance data in table form. This screen is displayed to the performance management client 129 by the performance analysis display 128. The contents of display are a comparison of the metrics values including the "I/O number per second" (403) and the "transfer rate" (404) at the same time point (401) for a plurality of volumes (402).

FIG. 5 shows an example of the performance data display screen in graph. This screen is also displayed to the performance management client 129 by the performance analysis display 128. The abscissa (503) and the ordinate (502) of the graph represent the time and the value of the metrics "transfer rate" (501), respectively. The contents of display in FIG. 5 are for comparing the temporal change of the transfer rate for a plurality of volumes (504).

The contents of display shown in FIGS. 4 and 5 are only an example, and various display methods are available other than for comparing the performance of a plurality of volumes. In the case where a client computer gives an instruction to display a given resource, for example, a plurality of metrics included in the designated resource may be displayed for comparison. As another example, the metrics data for the devices of the same model may be displayed collectively for each resource, or an average value for the devices of each type may be displayed. In the case where an identifier of a given network device is designated, the metrics value of a resource including the designated network device may be displayed in correspondence with the metrics value of the resource related to the designated resource.

Assume, for example, that the information is stored on the elements including the volume A, the logical volume A, the ports A, C, D, H, I and N defined as a cluster of resources. The storage network performance management software, in response to an instruction received from the client computer to designate the logical volume A, determines whether the information predefined as resources includes the data received or not. In the case where the received information includes the logical volume A, the storage network performance management software, based on the resources information containing the logical volume A, displays the performance data of the elements including the volume A, the logical volume A and the ports A, C, D, H, I and N. In this case, a plurality of ports are displayed on the same coordinate axis as a graph, while the volume A and the logical volume A may be displayed as different graphs. Also, in displaying these performance data, as shown in FIG. 3, the correspondence between a server, a switch and a storage may be displayed, with the icons illustrating each element displayed together with the performance data.

Figure 6:
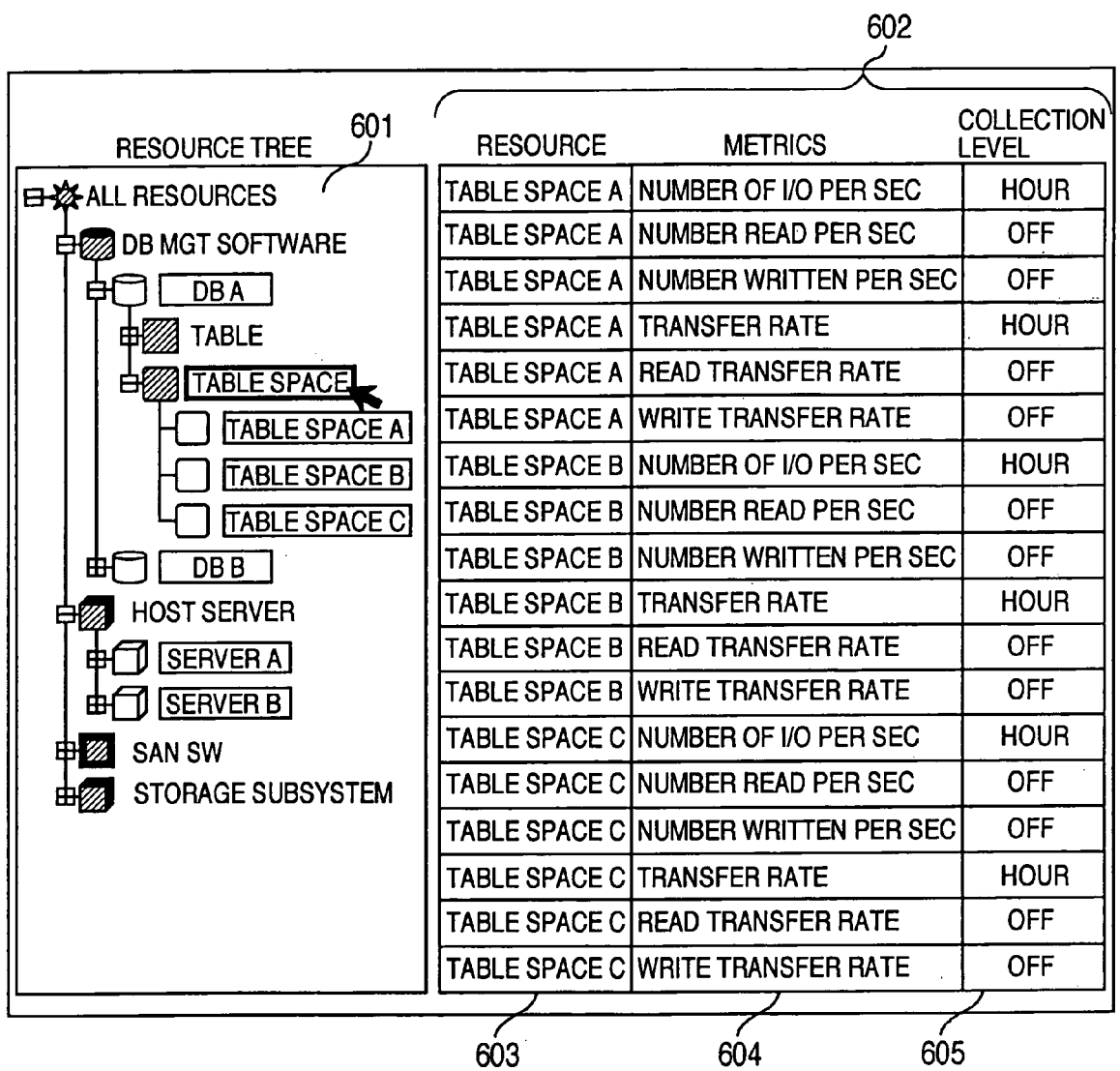
FIG. 6 is a diagram showing an example of a screen for setting the default performance data collection status.

FIG. 6 shows an example of the screen of the default performance data collection status. This screen is displayed to the performance management client 129 by the update rule setter 119, and used by the user to designate the default collection level of the metrics of all the resources in the storage network. The screen shown in FIG. 6 may be displayed either on the screen using the browser or the like in the client computer or by other methods.

The metrics collection level is a parameter indicating the degree and frequency of collection, and includes, for example, OFF (not collected), HOUR (collected once per hour), MINUTE (collected once per minute) and SECOND (collected once per second). This is only an example of the time intervals at which the data are collected, and the data may alternatively be collected only in the case where the storage configuration or the network system undergoes a change.

The resources in the storage network are classified and displayed in a tree structure based on the type and origin in the display field of the screen 601. The resource tree may be displayed on the screen in accordance with the coordinates of display predetermined for each of the factors including the storage device, the database management software and the host server.

The contacts or the contact labels in the tree structure are selected by the user with the mouse pointer or the like. The contact label is defined as the name of a resource or a resource classification group corresponding to a given setting. The "table space A", "table space B" and "database A", for example, are resource names. The "table space" and the "database management software" are the names of the groups into which the resources are classified. In other words, the group name of the resources "table space A" and "table space B" is the "table space".

In response to the selection made by the user as described above, a list of the selected resource (603), the metrics (604) and the default collection level (605) is displayed in the display field 602.

In the case of FIG. 6, the table space of the database management software operated on the server A of FIG. 3 is selected, and the default collection level is displayed for all the metrics of the table spaces A to C. By changing the contents displayed in the field 605, the default setting of data collection can be changed. The default performance data collection status table for storing the contents set on this screen is described in detail later with reference to FIG. 32.

Figure 7:
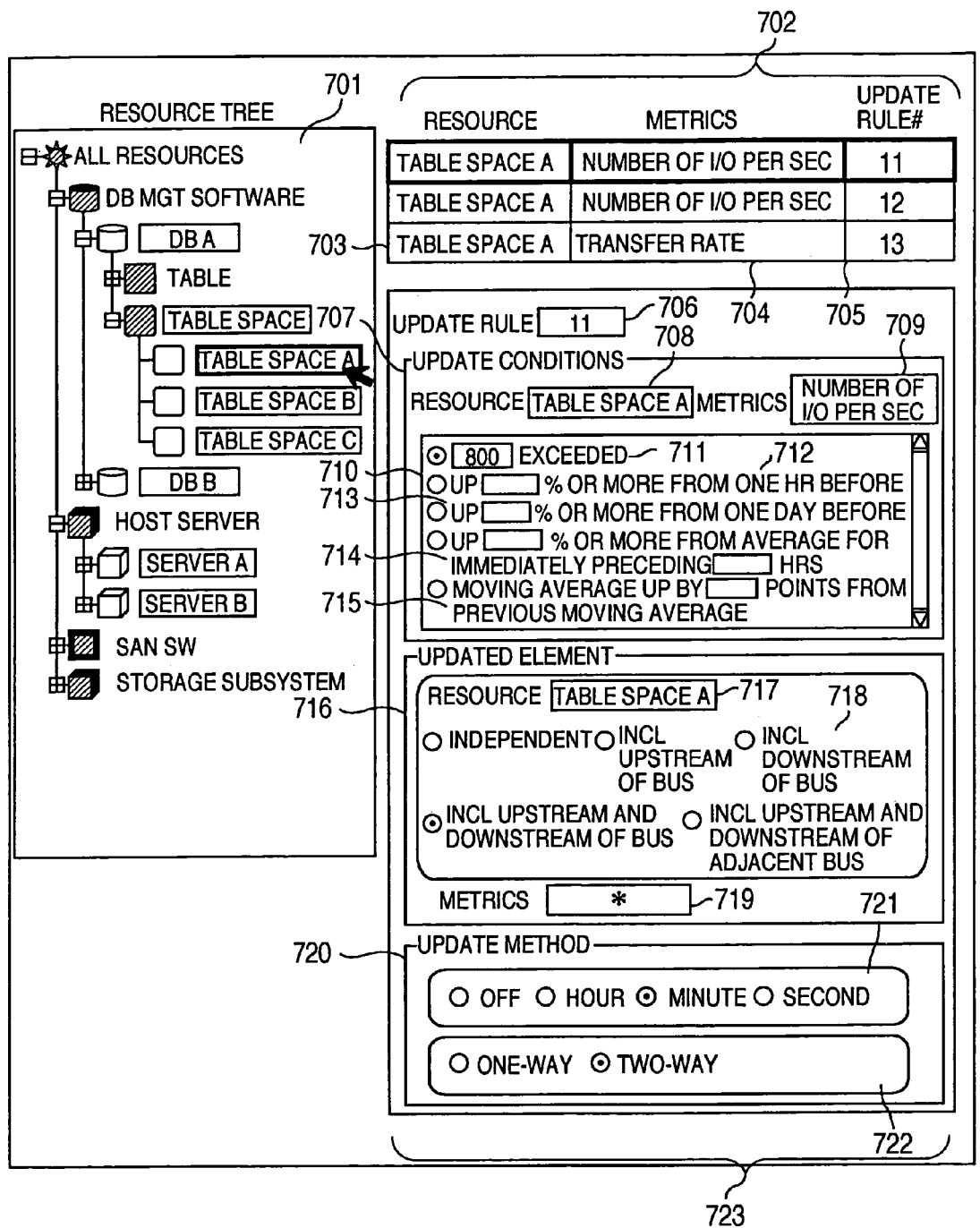
FIG. 7 is a diagram showing an example of an update rule setting screen for the performance data collection status.

FIG. 7 shows an example of the screen for setting the update rule of the performance data collection status. This screen is also displayed in the performance management client 129 by the update rule setter 119. The update rule setting screen is used by the user for inputting the update rule to designate the method of collecting the metrics value. As in the case of FIG. 6, once a contact ponit of the tree structure in the display field 701 is selected, a list of the ID numbers (705) of the update rule defined for the corresponding resource (703) and the metrics (704) is displayed in the display field 702. Also, the contents of the update rule selected from the list are displayed in the display field 723. In the case of FIG. 7, the table space A is selected in the display field 701, and a list of the update rules defined for the table space A is displayed in the display field 702. In the display field 723, on the other hand, the contents of the rule No. 11 in selected state in the display field 702 is displayed.

The update rule display field 723 includes an update rule number display field 706, an update condition designation field 707, an update rule designation field 716 and an update method designation field 720. The update condition designation field 707 further includes fields for designating a resource (708), a metrics (709) thereof and a metrics value status (710) constituting a motive of application of this rule.

A list of choices used for indicating the trend of the value level and change is displayed in the metrics value status designation field 710. Examples of the choices are:

(1) The metrics value exceeds a reference value designated by the parameter (711).

(2) The metrics value increases at more than the rate designated by the parameter with respect to the value as of one hour before (712).

(3) The metrics value increases at more than the rate designated by the parameter with respect to the value as of the same time point on the preceding day (713).

(4) The metrics value increases at more than the rate designated by the second parameter with respect to the average value nearest to the time point designated by the first parameter (714).

(5) The current moving average of the metrics value taken for each number of points designated by the parameter exceeds the preceding moving average (715). (For example, the performance data is acquired at the time points of one o'clock, two o'clock and three o'clock, and the sum of the acquired performance data values is divided by three thereby to acquire the moving average at three o'clock. The performance data are acquired at three o'clock, four o'clock and five o'clock, and from the performance data values thus acquired, the average is determined thereby to determine the moving average at five o'clock. The values of these moving averages are compared and the difference is determined. Depending on the metrics value, the performance data may be acquire at smaller time intervals. In the case where the variation is small, the moving average value may be acquired and determined once every several months.)

In the case of FIG. 7, the table space A and the number of I/Os per second are selected in the resource designation field 708 and the metrics designation field 709. In the metrics value status designation field 710, the choice 711 is selected and 800 is input as a parameter thereof. This setting is indicative of the update condition "the number of I/Os per second in the table space A exceeds 800".

The updated resource designation field 716 includes the fields for designating the resource (717), the related resource (178) with the resource (717) as an origin and the metrics (719), respectively. Once the update rule is applied, the method of collecting the metrics designated in the field 719 is changed for the resources designated in the fields 717 and 718. A list of the choices used for indicating the resources to which the rule is applicable is displayed in the related resource designation field 718. Examples of the choices include:

(1) Only the resource designated in the field 717.

(2) All the resources on the path upstream tracing the inter-resource performance dependency relation (toward the performance load-imposing side) from the resource designated in the field 717 as an origin.

(3) All the resources on the path downstream tracing the inter-resource performance dependency relation (toward the performance load-imposed side) from the resource designated in the field 717 as an origin.

(4) All the resources on the path upstream and downstream tracing the inter-resource performance dependency relation from the resource designated in the field 717 as an origin.

(5) All the resources on the path upstream and downstream tracing the inter-resource performance dependency relation from the resource designated in the field 717 as an origin, and all the resources on the path upstream and downstream tracing the inter-resource performance dependency relation from each resource on the path as a new origin.

The "performance load-imposing side" is defined as the side connected with the computer in which the software using the storage subsystem such as the database management software is operating. The "performance load-imposed side", on the other hand, is defined as the side nearer to the storage subsystem.

The aforementioned inter-resource relation governed by the rule is only an example, and other appropriate relations may be used. For example, the information on the bus between a storage and a server (storage port number, WWN (World-Wide Name), switch port number, host port number, host name, IP address, etc.) are stored in advance, and based on the bus information, the presence or absence of the interdependency relation between the resources may be determined.

The interdependency relation between the resources may be determined in such a manner that the direction in which the computer is connected for executing the application program of the devices included in the path is upstream, and the direction in which the storage is connected is downstream. In the configuration shown in FIG. 3, for example, a plurality of paths lead from the table A 303 to the parity group A. As an example, take the path leading from the table A through the table space A, the file B, the volume A, the ports A, C, D, H, I and N, the logical volume A to the parity group A. In this path, the table A, table space A, the file B and the volume A are located upstream of the volume A, while the volume A, the ports A, C, D, H, I and N, the logical volume A and the parity group A are located downstream of the volume A. Although only one path is taken as an example in this case, the resources to be governed by the rule can be designated alternatively by determining the upstream and downstream sides on a plurality of paths using a similar method.

The interdependency relation between the resources may be determined in other ways. By designating other resources having an interdependency relation with a given single resource as well as the particular resource alone, therefore, the labor of setting for individual resources can be saved.

Specific examples of the interdependency relation between resources is explained with reference to FIGS. 8A, 8B, 11A, 11B, 14A, 14B, 17A, 17B, 20 and 23.

In the case of FIG. 7, for example, the table space A is selected in the resource designation field 717, and a choice including the resources upstream and downstream of the path is selected in the related resource designation field 718. The asterisk (*) shown in the metrics designation field 719 indicates all the metrics of corresponding resources. Therefore, the setting of FIG. 7 is indicative of the fact that "the method of collecting all the metrics for the table space A and the resources upstream and downstream thereof is changed".

In the metrics designation field 719, either all the metrics may be designated as described above or a plurality of items such as "access frequency, port I/O frequency" by the user. Also, in accordance with the items designated in the related resource designation field 718, the user may select a metrics that can be designated and display the selected metrics on the screen as a menu.

The update method designation field 720 includes the field designating the collection level (721) and the field designating the requirement of automatic restoration (722). A list of choices for the metrics collection method used for application of the rule is displayed in the collection level designation field 721. Examples of the choices include:

(1) No metrics value is collected (OFF)

(2) The metrics value is collected once per hour (HOUR)

(3) The metrics value is collected once per minute (MINUTE)

(4) The metrics value is collected once per second (SECOND)

These timing of collecting the metrics data are only an example, and other choices may also be used. In accordance with the resources or metrics designated, for example, the timing of data collection may be changed.

In addition to the choices for the time interval of performance data collection and the choices for the requirement of performance data collection, a choice "data is collected once per 0.3 seconds", for example, may be set.

A list of choices as to how the effects of the change at the time of the rule application are handled after canceling the conditions for the rule application is displayed in the field 722 for designating the requirement of automatic restoration. These choices include:

(1) The effects are maintained even after the conditions are canceled (one-way)

(2) The effects are invalidated after the conditions are canceled (two-way)

The one-way choice is defined as a case in which the frequency of the performance data collection may change from low to high figure, but not from high to low figure, i.e. a case in which the time interval of data collection is never widened in the case where the conditions for the update rule application are canceled after narrowing the time interval of data collection.

The two-way choice, on the other hand, is defined as a case in which the frequency of performance data collection can be either decreased or increased. In the case where the two-way choice is selected and the conditions for the update rule application are canceled, the data collection frequency is restored to the original level. Specifically, the time interval of data collection from the resources involved may be either widened or narrowed to attain the same data collection time interval as before the update rule application.

The time interval of acquiring the performance data is described above as an example. The one-way and two-way concepts, however, may be applied also for other events.

Even in the case where the two-way choice is selected, a plurality of update rules having different collection levels may be applied to the same metrics, and therefore the collection level before application is not always restored after the conditions are canceled. In other words, even in the case where the application is canceled only for one update rule while a plurality of update rules are applicable, the other update rules may remain applicable.

The final collection method is determined with the highest collection level among the effective update rules. Among the collection levels designated in the collection level designation field 721, the one with a short data sampling period is determined high in level.

To summarize the example setting in the designation fields 707, 716 and 720 in FIG. 7, the update rule No. 11 is indicative of the fact that "once the number of I/Os per second in the table space A exceeds 800 per second, all the metrics of the table space A and the resources upstream and downstream thereof are changed to collect once for every minute (only in the case where the current collection level is lower). Also, once the conditions are canceled, the collection of all the metrics for the table space A and the resources upstream and downstream thereof are restored to the original level (or to a higher collection level whose update rule may be effective)".

The collection status update rule table for storing the contents of the update rule defined on the screen of FIG. 7 will be explained in detail with reference to FIG. 31.

FIGS. 8A and 8B show an example of the table configuration and the table structure of the related resource data storage used by the database performance data collection agent of the server A. Assume that numeral 106 in FIG. 2 designates the database performance data collection agent of the server A shown in FIG. 3. The related resource data storage 112 associated with it is configured of a database object-table space relation table 801 and a table space-file relation table 804. The contents of each table in FIGS. 8A and 8B are indicated by a stored value corresponding to the case of FIG. 3.

The database object-table space relation table 801 shown in FIGS. 8A and 8B is for recording the performance interdependency relation between the table resources or the index resources explained with reference to FIG. 3 and the table space resources, and includes a database object ID field 802 and a table space ID field 803. Each row in the table corresponds to one interdependency relation between the table or the index and the table space. The name or code (hereinafter referred to as the identifier) for identifying the table or the index is stored in the database object ID field 802. The identifier of the table space having the interdependency relation with the table or the index designated in the field 802 is stored in the table space ID field 803. In FIGS. 8A and 8B, for example, the interdependency relation between the table A and the table space A is recorded on the first row in the table.

The table space-file relation table 804 shown in FIG. 8 is for recording the performance interdependency relation between the table space resources and the file resources, and includes a table space ID field 805 and a file ID field 806. Each row in the table corresponds to one interdependency relation between the table space and the file. The identifier of the table space is stored in the table space ID field 805, and the identifier of the file having the interdependency relation with the table space designated in the field 805 is stored in the file ID field 806. In FIGS. 8A and 8B, for example, the interdependency relation between the table space A and the file A is recorded as the contents of the first row in the table.

FIG. 9 shows an example of the table structure of the performance data collection status table used by the database performance data collection agent of the server A shown in FIG. 3. The performance data collection status table 901 includes a resource ID field 902, a metrics ID field 903, a collection level field 904 and a last collection date and time field 905. Each row in the table indicates the collection status of a given metrics of a given resource. The resource identifier and the metrics identifier are stored in the resource ID field 902 and the metrics ID field 903, respectively.

The current collection level of the metrics designated in the field 903 for the resource designated in the field 902 is stored in the collection level field 904. The last collection date and time for the value of the metrics of the resources designated in the fields 902 and 903 is stored in the last collection date and time field 905 as long as the field 903 is not in OFF state. In the case where the field 902 is in OFF state, on the other hand, the latest date and time passed with the collection level OFF for the metrics of the resources designated in the fields 902 and 903 is stored in the last collection date and time field 905. In the shown case, the fact that the value of the number of the inserted records in table A has yet to be collected and this status lasted up to 15:00 o'clock, Jul. 31, 2003 is recorded in the first row of the table. In the last row but two of the same table, on the other hand, the fact is recorded that the value of the transfer rate of the table space C is currently collected once every hour and that the last collection date and time is 15 o'clock, Jul. 31, 2003.

FIG. 10 is a diagram showing an example of the structure of the metrics value table used by the database performance data collection agent of the server A shown in FIG. 3. The metrics value table 1001 includes a date and time field 1002, a resource ID field 1003, a metrics ID field 1004 and a metrics value field 1005. Each row in the table indicates the value of a given metrics collected for a given resource at a given date and time. The date and time when the metrics value is collected is stored in the date and time field 1002. The identifiers of the resource and the metrics to be collected are stored in the resource ID field 1003 and the metrics ID field 1004, respectively. The value of the metrics collected is stored in the metrics value field 1005.

In the case shown in FIG. 10, the fact that 165.3 was collected as the value of the number of I/Os per second in the table space A at 13:00 o'clock, Jul. 31, 2003 is recorded in the first row of the table. The performance data collection agent has a processing unit for analyzing the metrics value collected from the storage network component hardware or software by the performance data collection agent. Thus, the total value or the moving average of the metrics values is determined and may be stored in the metrics value table held by each performance data collection agent. Also, the performance data collection agent may execute such a process as totalizing the metrics values utilizing an external program.

FIGS. 11A, 11B, 14A, 14B, 17A, 17B, 20 and 23 each show an example of the table configuration and the table structure of the related resource data storage used by the host performance data collection agent of the server A shown in FIG. 3, the database performance data collection agent of the server B shown in FIG. 3, the host performance data collection agent of the server B shown in FIG. 3, the SAN switch performance data collection agent and the subsystem performance data collection agent, respectively.

FIGS. 11A and 11B show an example of the data in the related resource data storage by the host performance data collection agent of the server A shown in FIG. 3. The related resource data storage used by the host performance data collection agent of the server A includes a file-volume relation table 1101 and a volume-logical volume-port relation table 1104.

FIGS. 17A and 17B show an example of the data in the related resource data storage used by the host performance data collection agent of the server B shown in FIG. 3. The related resource data storage used by the host performance data collection agent of the server B includes a file-volume relation table 1701 and a volume-logical volume-port relation table 1704.

The related resource data storage used by the database performance data collection agent of the server B, like the database performance data collection agent of the server A shown in FIGS. 8A and 8B, includes a database object-table space relation table 1401 and a table space-file relation table 1404 shown in FIGS. 14A and 14B.

The related resource data storage used by the SAN switch performance data collection agent utilizes the data of the inter-port communication path table 2001 shown in FIG. 20. The related resource data storage used by the subsystem performance data collection agent includes a logical volume-parity group relation table 2301 shown in FIG. 23. The contents of the tables shown in FIGS. 11A, 11B, 14A, 14B, 17A, 17B, 20 and 23 are shown in the state with the values corresponding to the case of FIG. 3 stored therein.

A file-volume relation table (1101, 1701) is for recording the performance interdependency relation between the file source and the volume resource, and includes a file ID field (1102, 1702) and a volume ID field (1103, 1703). Each row in the tables corresponds to one interdependency relation between the file and the volume. A file identifier is stored in the file ID field (1102, 1702), and the identifier of the volume having the interdependency relation with the file designated in the file ID field is stored in the volume ID field (1103, 1703). In FIG. 11, for example, the interdependency relation between the file A and the volume A is recorded as the contents of the first row of the table 1101, and in FIGS. 17A and 17B, the interdependency relation between the file H and the volume D is recorded as the contents of the first row of the table 1701.

A volume-logical volume-port relation table (1104, 1704) is for recording the interdependency relation between the volume and the logical volume, and the interdependency relation between the volume and the logical volume on the one hand and the port nearer to the host bus adaptor and the port nearer to the storage subsystem on the input/output path connecting the volume and the logical volume on the other hand. The volume-logical volume-port relation table (1104, 1704) includes a volume ID field (1105, 1705), a logical volume ID field (1106, 1706), a host-side port ID field (1107, 1707) and a storage-side port ID field (1108, 1708).

A volume identifier is stored in the volume ID field (1105, 1705), and the identifier of the logical volume having the interdependency relation with the volume designated by the volume ID field is stored in the logical volume ID field (1106, 1706). The identifier of the port nearer to the host bus adaptor on the input/output path connecting a volume and a corresponding logical volume is stored in the host-side port ID field (1107, 1707), and the identifier of the port nearer to the storage subsystem is similarly stored in the storage-side port ID field (1108, 1708).

In FIGS. 11A and 11B, for example, the interdependency relation of the volume A with the logical volume A, the port A and the port N is stored as the contents of the first row of the table 1104, and in FIGS. 17A and 17B, the interdependency relation of the volume D with the logical volume D, the port B and the port P is stored as the contents of the first row of the table 1704.

The information indicating the interdependency relation of performance may include either the information on the metrics data and the resources on the path for accessing the storage from the computer or the information on the storage. It also may include the information on the table managed by the database management software, the information on the file managed by the file system, the correspondence between these information, or other information.

In the case where the information indicating the interdependency relation is stored in the storage, the path data held by the storage network performance management software and the data on the computer or storage are displayed on the screen using the client program (browser) or the like.

Further, by receiving the designation on the interdependency relation between the resources or between the metrics input into the client program by the user, the information indicating the interdependency relation may be stored in the storage based on the particular designation. As an alternative, the user may store the information indicating the interdependency relation in advance in the related resource data storage, or other methods may be used.

The database object-table space relation table 1401 of the server B shown in FIG. 14 includes a database object ID field 1402 and a table space ID field 1403. In similar fashion, the table space-file relation table 1404 of the server B includes a table space ID field 1405 and a file ID field 1406, both fields having similar contents. In the case of FIGS. 14A and 14B, for example, the interdependency relation between the table D and the table space D is recorded on the first row of the table 1401, and the interdependency relation between the table space D and the file H on the first row of the table 1404.

The inter-port communication path table 2001 shown in FIG. 20 is for recording the interdependency relation between the ports nearer to the host bus adaptor and nearer to the storage subsystem on the one hand and the SAN switch ports on the input/output path between the aforementioned two ports on the other hand. The inter-port communication path table 2001 includes a host-side port ID field 2002, a storage-side port ID field 2003 and a switch port IDs list field 2004.

The identifier of the port of the host bus adaptor is stored in the host-side port ID field 2002, and the identifier of the port of the storage subsystem is stored in the storage-side port ID field 2003. A series of identifiers of the SAN switch ports on the path connecting the port of the field 2002 and the port of the field 2003 is stored in the switch port IDs list field 2004. In the case of FIG. 20, for example, the interdependency relation between the ports A and N on the one hand and the port series therebetween (ports C, D, H and I) is recorded on the first row of the table.

In the switch port IDs list field 2004 shown in FIG. 20, the port identifiers are arranged in such a manner that the port identifiers of the switches connecting toward the server (the computer operated with DBMS, an application program, etc.) are arranged on the left side and the port identifiers of the switches connected toward the storage are arranged on the right side. Using this correspondence of the ports, in the case where one of "the upstream side of the bus", "the downstream side of the bus" and "the upstream and downstream sides of the bus" is designated, the left side of the port identifier group may be determined as "the upstream side of the bus" and the right side of the port identifier group as "the downstream side of the bus".

As an example, take a case in which the user designates the "switch A" as a resource 717 and "including the downstream side of the bus" in the related resource field 718 using the screen shown in FIG. 7. In the case where the data {ports C, D, H and I} is indicated in the switch port IDs list field 2004, the port D, but not port C of the switch A, nearer to the storage and the resources arranged on the right side of the port D are determined as located on the downstream side of the switch A. In other words, the ports D, H and I are the resources included in the downstream side of the bus.

The logical volume-parity group relation table 2301 shown in FIG. 23 is for recording the interdependency relation between the logical volume resource and the parity group resource. The logical volume-parity group relation table 2301 includes a logical volume ID field 2302 and a parity group ID field 2303. Each row in the table corresponds to one interdependency relations between the volume and the parity group. The identifier of the logical volume is stored in the logical volume ID field 2302, and the identifier of the parity group having the interdependency relation with the logical volume designated in the field 2302 is stored in the parity group ID field 2303. In the case of FIG. 23, for example, the interdependency relation between the logical volume A and the parity group A is recorded on the first row of the table.

FIG. 12 is a diagram showing an example of the performance data collection status table used by the host performance data collection agent of the server A.

FIG. 15 is a diagram showing an example of the performance data collection status table used by the database performance data collection agent of the server B.

FIG. 18 is a diagram showing an example of the performance data collection status table used by the host performance data collection agent of the server B.

FIG. 21 is a diagram showing an example of the performance data collection status table used by the SAN switch performance data collection agent.

FIG. 24 is a diagram showing an example of the performance data collection status table used by the subsystem performance data collection agent.

The structure of the performance data collection status tables (1201, 1501, 1801, 2101, 2401) used by these agents, like in the case of FIG. 9, each include the resource ID field (1202, 1502, 1802, 2102, 2402), the metrics ID field (1203, 1503, 1803, 2103, 2403), the collection level field (1204, 1504, 1804, 2104, 2404) and the last collection date and time field (1205, 1505, 1805, 2105, 2405). The contents of each field are stored by a corresponding agent. For the data stored in each field, refer to the explanation made with reference to FIG. 9.

FIG. 13 is a diagram showing an example of a metrics value table used by the host performance data collection agent of the server A.

FIG. 16 is a diagram showing an example of a metrics value table used by the database performance data collection agent of the server B.

FIG. 19 is a diagram showing an example of a metrics value table used by the host performance data collection agent of the server B.

FIG. 22 is a diagram showing an example of a metrics value table used by the SAN switch performance data collection agent.

FIG. 25 is a diagram showing an example of a metrics value table used by the subsystem performance data collection agent.

The structure of the metrics value tables (1301, 1601, 1901, 2201, 2501) used by these agents used by these agents, like in the case of FIG. 10, each include the date and time field (1302, 1602, 1902, 2202, 2502), the resource ID field (1303, 1603, 1903, 2203, 2503), the metrics ID field (1304, 1604, 1904, 2204, 2504) and the metrics value field (1305, 1605, 1905, 2205, 2505). The contents of each field are stored by a corresponding agent. For the data stored in each field, refer to the explanation made with reference to FIG. 10.

In the case of FIG. 21, all the values in the collection level field 2104 of the performance data collection status table 2101 used by the SAN switch performance data collection agent are OFF, and therefore the metrics value table 2201 of FIG. 22 is vacant.

FIGS. 26A to 28 show an example of the table configuration and the table structure of the related resource data storage 115 used by the storage network performance management software 109.

The related resource data storage 115 includes a database object-table space relation table 2601, a table space-file relation table 2604, a file-volume relation table 2701, a volume-logical volume-port correspondence table 2801 and a logical volume-parity group relation table 2704. The contents of these tables are produced by combining the contents of the related resource tables (801, 804, 1101, 1104, 1401, 1404, 1701, 1704, 2001, 2301) of all the performance data collection agents in the storage network, using the configuration information collector 114.

The database object-table space relation table 2601 shown in FIGS. 26A and 26B, like the tables 801 and 1401, includes a database object ID field 2602 and a table space ID field 2603. The data stored in each field are similar to those explained with reference to the table 801.

The configuration information collector 114 included in the storage network performance management software 109 collects the data of the tables 801 and 1401, and all the rows of the tables 801 and 1401 are combined to make up the rows of the table 2601.

The table space-file relation table 2604 shown in FIGS. 26A and 26B, like the tables 804 and 1404, includes a table space ID field 2605 and a file ID field 2606. Also, the data stored in each field are similar to those explained with reference to the table 804.

The configuration information collector 114 included in the storage network performance management software 109 collects the information of the tables 804 and 1404, and all the rows of the tables 804 and 1404 are combined to make up the rows of the table 2604.

The file-volume relation table 2701 shown in FIGS. 27A and 27B, like the tables 1101 and 1701, includes a file ID field 2702 and a volume ID field 2703. The data stored in each field are similar to those explained above.

The configuration information collector 114 included in the storage network performance management software 109 collects the information of the tables 1101 and 1701, and all the rows of the tables 1101 and 1701 are combined to make up the rows of the table 2701.

The volume-logical volume-port correspondence table 2801 shown in FIG. 28, like the tables 1104, 1704 and 2001, includes a volume ID field 2802, a logical volume ID field 2803, a host-side port ID field 2804, a storage-side port ID field 2805 and a switch port IDs list ID field 2806. The data stored in each field are similar to those explained with reference to the table 1104.

The configuration information collector 114 included in the storage network performance management software 109 collects the data of the tables 1104, 1704 and 2001, and all the rows of the tables 1104 and 1704 are combined and coupled with the table 2001 with the host-side port and the storage-side port as a key to make up the table 2801.

The logical volume-parity group relation table 2704 shown in FIGS. 27A and 27B, like the table 2301, includes a logical volume ID field 2705 and a parity group ID field 2706. The data stored in each field are similar to those explained with reference to the table 2301.

The configuration information collector 114 included in the storage network performance management software 109 collects and stores the data of the table 2301. The rows of the table 2704 coincide with those of the table 2301.

In the configuration example shown in FIG. 3, only one storage subsystem (subsystem A) is monitored by only one agent, and therefore the table 2704 coincides with the table 2301. Nevertheless, this is not always the case. In the case of a configuration including a plurality of subsystems and a plurality of agents, for example, the rows of a plurality of the tables are combined into one table and therefore the contents of the table fail to coincide.

FIG. 29 is a diagram showing an example of the structure of the performance data collection status table 121 used by the storage network performance management software 109. Each portion of the contents of this table is distributed to a corresponding agent in the network by the collection status updater 117, so that the data are stored in the performance data collection status table (901, 1201, 1501, 1801, 2101, 2401) by the particular agent.

The performance data collection status table 121 shown in FIG. 29, like the table 901, includes a resource ID field 2901, a metrics ID field 2902, a collection level field 2903 and a last date and time field 2904. The data stored in each field are similar to those explained with reference to the table 901, etc. Except for the contents of the last collection date and time field, the rows of all the tables 901, 1201, 1501, 1801, 2101 and 2401 are combined to make up the rows of the table 121.

The last collection date and time fields of these tables are each used individually by a corresponding agent and storage network performance management software, and therefore even the values of the corresponding rows may fail to coincide with each other.

FIG. 30 is a diagram showing an example of the structure of the metrics value table 127 used by the storage network performance management software 109. The contents of this table are produced by the storage network performance management software 109 combining, using the performance data collector 126, the contents of the metrics value tables (1001, 1301, 1601, 1901, 2201, 2501) from all the performance data collection agents in the storage network. The metrics value table 127, like the table 1001, etc. includes a date and time field 3001, a resource ID field 3002, a metrics ID field 3003 and a metrics value field 3004. The data stored in each field are similar to those explained with reference to the table 1001, etc. The performance data collector 126 collects the data of the tables 1001, 1301, 1601, 1901, 2201 and 2501, and all the rows of the data collected are combined to make up the rows of the table 127.

FIGS. 31 to 33 are diagrams showing an example of the table configuration and the table structure of the collection status update data storage 118 used by the storage network performance management software. The collection status update data storage 118 includes a collection status update rule table 3101, a default performance data collection status table 3201 and an update rule activation status table 3301.

FIG. 31 is a diagram showing an example of the structure of the collection status update rule table. The collection status update rule table 3101 is for recording the contents of the update rule defined by the user through the update rule setting screen explained with reference to FIG. 7. The collection status update rule table 3101 includes an update condition resource field 3102, an update condition metrics field 3103, an update rule number field 3104, an update condition code field 3105, an update condition parameter list field 3106, an updated resource field 3107, an updated resource extension code field 3108, an updated metrics field 3109, a new collection level field 3110 and a change direction code field 3111.

Each row of the collection status update rule table 3101 corresponds to one update rule. The identifier of the resource designated in the field 708 and the identifier of the metrics designated in the field 709 are stored in the update condition resource field 310 and the update condition metrics field 3103, respectively. The number assigned each time of definition of a new rule and indicated in the field 706 is stored in the update rule number field 3104. The code for identifying the choice selected in the metrics value status designation field 710 is stored in the update condition code field 3105. In the case of FIG. 31, for example, the code "1" is stored in the update condition code field 3105. The conditions 711 to 715 indicated in the metrics value status field 710 are assigned codes, respectively, thereby to store the codes corresponding to the conditions designated from the screen of FIG. 7. In the case under consideration, the code "1" corresponds to the condition 711 in FIG. 7. Upon designation of the condition 711 by the user, the code "1" is stored in the update condition code field 3105 of the collection status update rule table 3101.

A list of parameters assigned to the choices selected in the field 710 is stored in the update condition parameter list field 3106. The identifier of the resource designated in the field 717 is stored in the updated resource field 3107. The code for identifying the choice selected by the related resource designation field 718 is stored in the updated resource extension code field 3108. As an example, five conditions, i.e. "independent", "include upstream side of bus", "include downstream side of bus" "include upstream and downstream sides of bus" and "include upstream and downstream sides of adjacent bus" are displayed in the related resource designation field 718 of FIG. 7. These conditions are assigned the codes "1" to "5", respectively. This example indicates a case in which the user has selected the choice "include upstream and downstream sides of bus" in the related resource designation field 718. Thus, the code "4" corresponding to the selected condition is stored in the updated resource extension code field 3108.

The identifier or the asterisk of the metrics designated in the field 719 is stored in the updated metrics field 3109. The ID code of the collection level designated in the field 721 is stored in the new collection level field 3110. The code for identifying the choice selected in the field 722 is stored in the change direction code field 3111. In FIG. 31, for example, the update rule illustrated in the screen of FIG. 7 is recorded on the first row of the table. In the case of FIG. 7, two conditions including "one-way" and "two-way" are indicated in the automatic restoration possibility designation field 722. These conditions are assigned the codes "1" and "2", respectively. In the case of FIG. 7, for example, the user designates the condition "two-way", and therefore the code "2" corresponding to the designated condition is stored in the updated metrics field 3019. The correspondence between the conditions and the codes, which is used in this case as an example, may be replaced with other correspondence to manage the data.

FIG. 32 is a diagram showing an example of the structure of the default performance data collection status table. The default performance data collection status table 3201 is for recording the default collection level designated by the user on the screen explained with reference to FIG. 6. The default performance data collection status table 3201 includes a resource field 3202, a metrics field 3203 and a default collection level field 3204. The default collection level is registered on each row of the table for each metrics and each resource. In order to reduce the table size, however, the registration is omitted for the collection level of OFF. The identifier of the resource designated in the field 603 and the identifier of the metrics designated in the field 604 are stored in the resource field 3202 and the metrics field 3203, respectively. In FIG. 32, for example, the contents set on the first row of the list in the display field 602 illustrated in FIG. 6 is recorded on the first row of the table.

FIG. 33 shows an example of the structure of the update rule activation status table. A plurality of update rules are generally required to change the metrics collection level. In the case where a plurality of update rules including the same metrics in the applicable range meet the applicable conditions, the collection level is required to be set to the highest one in the rules. Assume, on the other hand, that the applicable conditions of the rule are canceled. The collection level is restored to the highest one among the remaining effective rules in the case where the two-way automatic restoration is designated, while the current collection level is maintained otherwise.

The update rule activation status table 3301 is for recording the update rule in effective state to realize the process described above and the collection level designated for metrics under the particular rule. The update rule activation status table 3301 includes an update rule number field 3302, a resource field 3303, a metrics field 3304 and a collection level field 3305.

An update rule meeting the current applicable conditions or the number of the update rule meeting the past applicable conditions with the one-way automatic restoration designated, is stored in the update rule number field 3302.

The contents stored in the update rule number field 3302 are described in detail. The update rule has either a two-way designation or one-way designation of automatic restoration. According to the rule of two-way designation of automatic restoration, it is determined whether the applicable conditions are met or not at the time point of application of the two-way rule, and in accordance with the result of this determination, it is determined whether the update rule is effective or not. The two-way rule, therefore, is registered in the update rule activation status table in the case where the applicable conditions are met, and deleted from the same table unless the applicable conditions are met, thereby maintaining the effective rule in the table.

With regard to the rule with the one-way designation of automatic restoration, on the other hand, the update rule remains effective once the applicable conditions are met even after the same conditions are canceled. The "way" in the "two-way" and "one-way" indicates the direction in which the collection frequency is changed. Specifically, the one-way change is indicative of a change only from low to high frequency, and the two-way change is a case where the change is either from high to low frequency or from low to high frequency. The one-way update rule, therefore, is registered in the update rule activation status table as soon as the applicable conditions are met, and subsequently kept registered in the table. In this way, the effective update rule is held in the table. The result is that "the number of the update rule meeting the current applicable conditions or the number of the update rule meeting the past conditions and having one-way designation of automatic restoration is stored in the update rule number field 3302".

The resources governed by the rule of the field 3302, the metrics identifier and the collection level used at the time of application of the rule are stored in the resource field 3303, the metrics field 3304 and the collection level field 3305, respectively.

Figure 34:
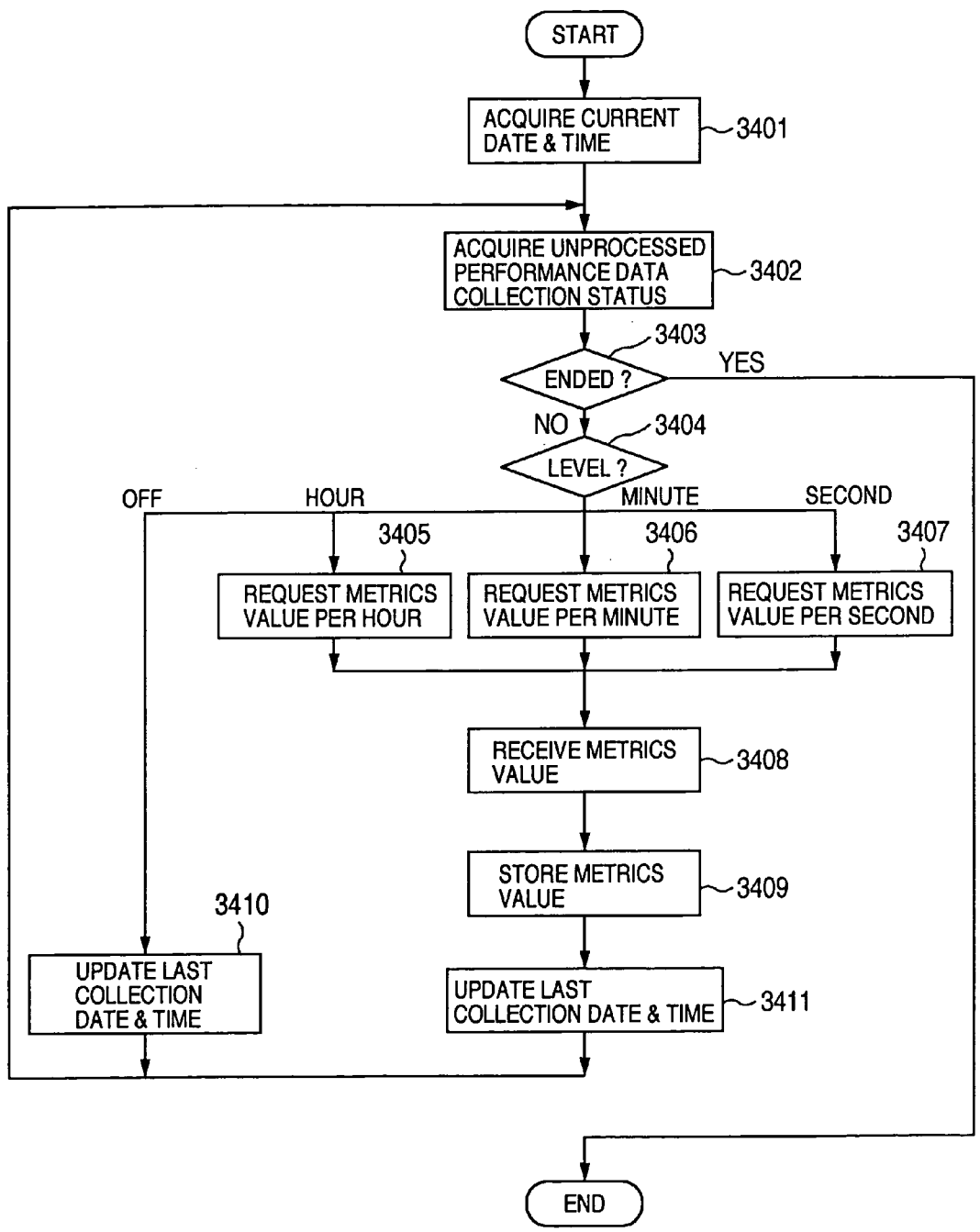
FIG. 34 is a flowchart showing the steps of the performance data collection process of the performance data collection agent and the storage network performance management software.

FIG. 34 is a flowchart showing the steps of the performance data collection process of the performance data collection agent and the storage network performance management software. These processing steps are started periodically by a timer in accordance with a set schedule, or at the request of the storage network performance management software 109 by the performance data collection agent 106.

First, the steps for a case involving the performance data collection agent are explained.

In step 3401, the current date and time are acquired using the function of the server on which the agent is operating, and then the process proceeds to step 3402.

In step 3402, those registration rows of the performance data collection status table (120, 901, 1201, 1501, 1801, 2101, 2401) which are not yet processed after starting the current steps are acquired, and the process proceeds to step 3402.

Once it is determined in step 3403 that all the registration rows are processed, the process is terminated. In the case where there remains any registration row yet to be processed, the process proceeds to step 3404.

In other words, the performance data collector 123 of the performance data collection agent 106, after being activated, accesses the performance data collection status table 120, etc. In this way, the possibility and frequency of collection and the collection status such as the last date and time are checked for the performance items of the storage network component hardware or software in charge of the performance data collection agent 106. In the case where the data are not collected, an unprocessed state is determined, while a processed state is determined in the case where the data is collected.

The foregoing explanation of the contents is supplemented. Each row of the performance data collection status table 120, etc. corresponds to each of the performance items of the storage network component hardware or software in charge of the corresponding agent.

The repetitive loop through the step 3402, 3403, 3404, 3410 or 341 and returning to step 3402 is followed once for each row of the performance data collection status table 120, etc. In the case where a performance item corresponding to a particular row is an object of collection (the collection level of HOUR or MINUTE or SECOND), the data are collected. Otherwise (in the case where the collection level is OFF), the data are not collected but only the last date and time is updated.

The termination determining process for passing through the repetitive loop in step 3403 (the determination as to whether the process proceeds from step 3403 to 3404 or to "end") is the one for determining whether the process is over or not for all the rows in the performance data collection status table 120, etc. In other words, it is determined whether the data processing for all the performance items of the storage network component hardware or software in charge of the corresponding agent (the process of correcting the data to be collected or updating the last date and time if the data is not to be collected) is completed or not.

In step 3404, the values in the collection level fields (904, 1204, 1504, 1804, 2104, 2404) on the registration rows acquired from the performance data collection status table are checked. In the case where the collection level is HOUR (collected once every hour), the process proceeds to step 3405. In the case where the collection level is MINUTE (collected once every minute), on the other hand, the process proceeds to step 3406, while in the case where the collection level is SECOND (collected once every second), the process proceeds to step 3407. In the case where the collection level is OFF (not collected), the process proceeds to step 3410.

In step 3405, the values of the resource ID field (902, 1202, 1502, 1802, 2102, 2402), the metrics ID field (903, 1203, 1503, 1803, 2103, 2403) and the last collection date and time field (905, 1205, 1505, 1805, 2105, 2405) on the registration row acquired in step 3402 are checked. The metrics value for each hour during the period from the last date and time to the current date and time acquired in step 3401 is requested against the performance data acquirer 122 of the storage network component hardware or software having the particular resource, and then the process proceeds to step 3408.

In step 3406, substantially similarly to step 3405, the metrics value for each minute of the above-mentioned period is requested and the process proceeds to step 3408.

In step 3407, substantially similarly to step 3405, the metrics value for each second of the above-mentioned period is requested and the process proceeds to step 3408.

In step 3408, the requested metrics value is received from the performance data acquirer 122, and the process proceeds to step 3409.

In step 3409, the received metrics value is added to the metrics value table (124, 1001, 1301, 1601, 1901, 2201, 2501) and the process proceeds to step 3411.

In step 3411, the latest one of the date and time of the metrics values received in step 3408 is stored in the last date and time field (905, 1205, 1505, 1805, 2105, 2405) on the registration row acquired in step 3402, and the process returns to step 3402.

In step 3410, the current date and time acquired in step 3401 is stored in the last collection date and time field (905, 1205, 1505, 1805, 2105, 2405) on the registration row acquired in step 3402, and the process returns to step 3402.

Next, an explanation is given about the steps executed for the storage network performance management software in FIG. 34. The performance data collector 126 of the storage network performance management software 109 is activated periodically in accordance with a predetermined schedule setting.

First, in step 3401, the current date and time is acquired by use of the function provided by the server operated with the storage network performance management software, and the process proceeds to step 3402.

In step 3402, the registration row of the performance data collection status table 121 which has yet to be processed after the start of the current process is acquired.

Specifically, in step 3402, the performance data collector 126 searches the performance data collection status table 121 for the collection status of the metrics, and acquires the performance data not yet collected (not yet processed), and the process proceeds to step 3403.

In the case where it is determined in step 3403 that the all the registration rows have been processed, the process is terminated. In the case where there remains a registration row not yet processed, on the other hand, the process proceeds to step 3404.

The contents of the foregoing explanation are supplemented. Each row of the performance data collection status table 121 corresponds to one performance item of the storage network component hardware or software in charge of any of the agents governed by the storage network performance management software 109.

The repetitive loop returning to step 3402 through step 3402, 3403, 3404, 3410 or 3411 makes one loop for each row of the performance data collection status table 121. In the case where the performance item corresponding to a particular row is an object of collection (the collection level is HOUR, MINUTE or SECOND), the data is collected from the agent, while in the case where the row is not an object of collection (the collection level is OFF), the data is not collected and only the last date and time is updated.

The determination in step 3403 as to whether the repetitive loop is to be passed through or not (whether the process proceeds to step 3404 or is terminated) is the process executed for all the rows of the performance data collection status table 121. In other words, it is determined that the process (the process of collecting the data to be collected and updating the last date and time for the data not to be collected) has been completed for all performance items in charge of all the agents, and in accordance with the result of determination, the process proceeds to the next step.

In step 3404, the value of the collection level field 2903 on the registration row acquired from the performance data collection status table 121 is checked. In the case where the collection level is HOUR (collected once every hour), the process proceeds to step 3405. In the case where the collection level is MINUTE (collected once every minute), on the other hand, the process proceeds to step 3406, while in the case where the collection level is SECOND (collected once every second), the process proceeds to step 3407. In the case where the collection level is OFF (not collected), the process proceeds to step 3410.

In step 3405, the values are checked of the resource ID field 2901, the metrics ID field 2902 and the last collection date and time field 2904 on the registration row acquired in step 3402. The value of the metrics for every one hour of the period from the last collection date and time to the current date and time acquired in step 3401 are requested from the performance data responder 125 is requested against the performance data responder 125 of the performance data collection agent in charge of collecting the data for the particular resource, and the process proceeds to step 3408.

In other words, the performance data responder 125 of the corresponding performance data collection agent 106 is requested to transmit the metrics value to be collected.

In step 3406, substantially similarly to step 3405, the metrics value for each minute of the same period is requested, and the process proceeds to step 3408.

In step 3407, substantially similarly to step 3405, the metrics value for each second of the same period is requested, and the process proceeds to step 3408.

In step 3408, the requested metrics value is received from the performance data responder 125, and the process proceeds to step 3409.

In step 3409, the received metrics value is added to the metrics value table 127, and the process proceeds to step 3411.

In step 3411, the latest one of the date and time held in the metrics value received in step 3408 is stored in the last collection date and time field 2904 on the registration row acquired in step 3402, and the process returns to step 3402.

In step 3410, the current date and time acquired in step 3410 is stored in the last collection date and time field 2904 on the registration row acquired in step 3402, and the process returns to step 3402.

FIG. 35 is a flowchart showing the steps of the collection status update process of the storage network performance management software. These processing steps are started by a timer periodically in accordance with a schedule setting or with the updating of the metrics value table 127 as a motive.

First, in step 3501, those registration rows of the collection status update rule table 3101 which are not processed after starting the current process are acquired, and the process proceeds to step 3502.

In the case where it is determined in step 3502 that all the registration rows have been processed, the process is terminated. In the case where there remains any registration row not yet processed, on the other hand, the process proceeds to step 3503.

The contents of this process are described in detail. Each row of the collection status update rule table 3101 corresponds to the update rule for the collection status defined by the user through the screen shown in FIG. 7. The repetitive loop returning to step 3501 through steps 3501, 3402, 3403, etc. makes one loop for each row of the collection status update rule table 3101. In accordance with whether the conditions for the update rule corresponding to each row of the collection status update rule table 3101 are met or not, the collection status of the performance data is updated or maintained as it is.

The determination in step 3502 as to whether the repetitive loop is left to terminate the process or the process proceeds to step 3503 is the process for determining whether the conditions are met or not of all the update rules registered in the collection status update rule table 3101 (all the rows included in the collection status update rule table 3101) and determining to which step the process is to proceed. Specifically, in the case where it is determined that the process of updating the collection status of the performance data has been completed for all the rows, the process proceeds to end (from step 3502 to YES). In the case where it is determined that there remains a row for which the update rule conditions have yet to be met and the update process for the collection status of the performance data has yet to be executed, on the other hand, the process proceeds from step 3502 to step 3503.

In step 3503, first, the values of the update conditions resource field 3102 and the update conditions metrics field 3103 on the registration row acquired in step 3501 are checked. The performance data collection status table 121 is searched for a row on which the resources and the metrics are coincident with the contents of the resource ID field 2901 and the metrics ID field 2902, respectively, and the value in the last collection date and time field 2904 for the row thus found is checked. It is then determined whether the particular last collection date and time is included in the period from the previous start of the current process to the present start of the process. In the case where the last collection date and time is so included, the process proceeds to step 3504, otherwise the process returns to step 3501.

In step 3504, first, the values are checked of the update condition code field 3105, the update conditions parameter list field 3106 and the change direction code field 3111 on the registration row acquired in step 3501. The metrics value necessary for determining whether the update conditions are met or not is acquired from the metrics value table 127, and the process proceeds to step 3505.

In the case where it is determined in step 3505 that the update conditions are met, the process proceeds to step 3506. In the case where the update conditions fail to be met and the change direction is two ways, then the process proceeds to step 3507. In the case where the update conditions fail to be met and the change direction is one way, on the other hand, the process returns to step 3501.

In step 3506, first, the values are checked of the updated resource field 3107 and the updated resource extension code field 3108 on the registration row acquired in step 3501. By tracing the relation in the related resource table (2601, 2604, 2701, 2801, 2704, etc.) of the related resource data storage 115, the updated resource designated by the updated resource extension code is determined.

One of the updated resources is acquired for which the update rule has yet to be applied to the metrics (the metrics designated by the updated metrics field 3109 acquired in step 3501) of the corresponding updated resource (the resource selected in step 3506), and the process proceeds to step 3508.

In the foregoing description, the "process of applying the update rule to the corresponding metrics (the metrics designated by the updated metrics field 3109 for the row acquired in step 3501) of the corresponding updated resource (the resource selected in step 3506)" is indicative of the process of subsequent steps 3508, 3510 and 3512 to 3521.

In the case where it is determined in step 3508 that all the updated resources have been processed, the process returns to step 3501. In the presence of an updated resource not yet processed, on the other hand, the process proceeds to step 3510.

In step 3510, the values of the updated metrics field 3109 on the registration row acquired in step 3501 are checked. One of the updated metrics that is yet to be processed is acquired, and the process proceeds to step 3512.

In the case where it is determined in step 3512 that all the updated metrics have been processed, the process returns to step 3506. In the case where there remains an unprocessed metrics, on the other hand, the process proceeds to step 3514.

In step 3514, a row on the update rule activation status table 3301 is searched for in which the update rule number field 3104 on the registration row acquired in step 3501, the unprocessed updated resource in step 3506 and the unprocessed updated metrics in step 3510 coincide with the contents of the update rule number field 3302, the resource field 3303 and the metrics field 3304, respectively. In the absence of a corresponding row, the process proceeds to step 3516. Otherwise, the process returns to step 3510.

In step 3516, the number and the collection level of the unprocessed update rule selected in step 3501, the unprocessed updated resource selected in step 3506 and the unprocessed updated metrics selected in step 3510 are registered in the update rule activation status table 3301, and the process proceeds to step 3518.

In step 3518, it is determined whether the collection level newly registered in step 3516 is higher or not than the collection level registered in the update rule activation status table 3301 for the same resource and the same metrics. In the case where the newly registered collection level is higher, the process proceeds to step 3519, otherwise, the process returns to step 3510.

In step 3519, the collection status updater 116 of the agent for collecting the data of the updated resource selected in step 3506 is requested to update the collection level of the corresponding metrics of the corresponding resource of the performance data collection status table (120, 901, 1201, 1501, 1801, 2101, 2401), and the process proceeds to step 3521.

Similarly, in step 3521, the collection level of the corresponding metrics of the corresponding resource of the performance data collection status table 121 is updated, and the process returns to step 3510.

In step 3507, first, the values are checked of the updated resource field 3107 and the updated resource extension code field 3108 on the registration row acquired in step 3501. Also, the updated resource designated by the updated resource extension code is checked by following the relation in the related resource table (2601, 2604, 2701, 2801, 2704, etc.) of the related resource data storage 115. One of the unprocessed updated resources is acquired and the process proceeds to step 3509.

In the case where it is determined in step 3509 that all the updated resources have been processed, the process returns to step 3501, otherwise the process proceeds to step 3511.

In step 3511, the value of the updated metrics field 3109 on the registration row acquired in step 3501 is checked. One of the unprocessed updated metrics is acquired, and the process proceeds to step 3513.

In the case where it is determined in step 3513 that all the updated metrics have been processed, the process returns to step 3507. In the case where there remains an updated metrics unprocessed, on the other hand, the process proceeds to step 3515.

In step 3515, a row on the update rule activation status table 3301 is searched for in which the update rule number field 3104 on the registration row acquired in step 3501, the unprocessed updated resource in step 3507 and the unprocessed updated metrics in step 3511 coincide with the contents of the update rule number field 3302, the resource field 3303 and the metrics field 3304, respectively. In the presence of a corresponding row, the process proceeds to step 3517. Otherwise, the process returns to step 3511.

In step 3517, a row of the update rule activation status table 3301 is deleted in which the number of the unprocessed update rule selected in step 3501, the unprocessed updated resource selected in step 3507 and the unprocessed updated metrics selected in step 3511 are coincident with each other. Then, the process proceeds to step 3520.

In step 3520, first, the highest collection level in the registration rows of the update rule activation status table 3301 in which the updated resource selected in step 3507 and the updated metrics selected in step 3511 coincide with each other. The collection status updater 116 of the agent for collecting the data of the particular updated resource is requested to update the collection level of the corresponding metrics of the corresponding resource of the performance data collection status table (120, 901, 1201, 1501, 1801, 2101, 2401) to a determined level, and the process proceeds to step 3522.

Similarly, in step 3522, the collection level of the corresponding metrics of the corresponding resource is updated and the process returns to to step 3511.

According to this embodiment, based on the performance data collected from the storage network component elements to be monitored, the range or degree of subsequent data collection can be automatically adjusted as required. More specifically, the performance data is collected in accordance with the following steps (2) to (5) or (1) to (5).

(1) An instruction (choice or parameter) to concretely specify a method according to the following steps (2) to (4) is acquired from the user of the storage network.

(2) The timing of changing the collection method is determined based on the performance data already collected. This timing is determined according to the following steps (2A) to (2C). In the case where the process is started with step (1), the timing is determined in accordance with the instruction acquired in step (1) from the following steps (2A) to (2C).

(2A) The time point when the value of a specific performance item obtained for a specific collected element is excessively large or excessively small (higher or lower than a specific reference).

(2B) The time point when a sign is recognized that the value of a specific performance item obtained for a specific collected element is excessively large or excessively small (the value change is larger or smaller than a specific reference).

(2C) The time point when the state in which the value of a specific performance item obtained for a specific collected element is excessively large or excessively small (larger or smaller than a specific reference) is canceled, or the time point when a sign of the particular state is canceled (the value change is smaller or larger than a specific reference).

(3) At the timing described above, the collected element for the performance data of which the collection method is to be changed is selected. The selection method is determined in accordance with the following steps (3A) to (3D). In the case where the process is started with step (1), the selection method is determined in accordance with the designation acquired in step (1) from the following steps (3A) to (3D).

(3A) With the collected element giving a motive of determining the timing in step (2) as an origin, a collected element is selected on the path tracing the interdependency relation to the upstream side imposing a load on the performance, using the performance interdependency relation between the collected elements.

(3B) With the collected element giving a motive of determining the timing in step (2) as an origin, a collected element is selected on the path tracing the interdependency relation to the downstream side imposed with a performance load, using the performance interdependency relation between the collected elements.

(3C) With the collected element giving a motive of determining the timing in step (2) as an origin, a collected element is selected on the path tracing the interdependency relation to the upstream side imposing a performance load and the downstream side imposed with a performance load, using the performance interdependency relation between the collected elements.

(3D) With the collected element giving a motive of determining the timing in step (2) as an origin, a collected element is selected on the path tracing the interdependency relation to the upstream side imposing a performance load and the downstream side imposed with a performance load, using the performance interdependency relation between the collected elements, while at the same time selecting a collected element on the path tracing the performance interdependency relation to the upstream and downstream sides with each collected element on the path as a new origin.

(4) A collection method and an update method for the performance data are determined with regard to the selected collected elements. The update method is determined in accordance with any of the following processes. Specifically, the update method is determined in accordance with the following steps (4A) to (4D). In the case where the process is started with step (1), the update method is determined in accordance with the instruction acquired in step (1) from the following steps (4A) to (4D).

(4A) To change the collection method in such a manner as to collect the hitherto uncollected values of specified performance items of the collected elements selected in step (3).

(4B) To change the collection method in such a manner as to increase the frequency of collecting the values of specified performance items of the collected elements selected in step (3) than in the prior art.

(4C) To change the collection method in such a manner as to decrease the frequency of collecting the values of specified performance items of the collected elements selected in step (3) than in the prior art.

(4D) To change the collection method in such a manner as not to collect the hitherto collected values of specified performance items of the collected elements selected in step (3).

(5) The method of collecting the performance data is changed in accordance with the update method determined above.

Once the collection method is changed in step (5) in accordance with step (4A) or (4B), the method is automatically switched to collect the hitherto uncollected values of the performance items or to collect at a higher frequency the values hitherto collected at a low frequency. By delaying the collection of the performance items or reducing the collection frequency until a need arises, therefore, the amount of the performance data collected can be suppressed.

Once the collection method of step (5) is changed at the timing determined in step (2B), the sign of temporal change of the performance data to be monitored is grasped, and therefore the chance of losing the timing of data acquisition is reduced as compared with the case where the timing of step (2A) is used.

Once the collection method is changed in the way according to step (4A) or (4B) for the collected elements selected in step (3A), the collected elements on the upstream side imposing a load on the elements of which the performance data has undergone a notable change are newly added as elements to be monitored or come to be monitored at a higher frequency, and therefore the effective data for the follow-up check of the cause of the change thereof can be obtained. Once the collection method is changed in the way according to step (4A) or (4B) for the collected elements selected in step (3B), the collected elements on the downstream side loaded by the elements of which the performance data has undergone a notable change are newly added as elements to be monitored or come to be monitored at a higher frequency, and therefore the effective data for the follow-up check of the cause of the change thereof can be obtained.

Once the collection method is changed in the way according to step (4A) or (4B) for the collected elements selected in step (3C) or (3D), the collected elements on the upstream side imposing a load on the elements of which the performance data has undergone a notable change and the collected elements on the downstream side imposed with a load, and further the elements on other paths contacted by any of the elements on the path from the upstream to downstream side come to be newly monitored. Thus, especially in the case where the performance interdependency relation between the elements is complicated, the effective data to carry out the follow-up check of the cause and effects of the change can be obtained.

Once the collection method is changed in the way according to step (4C) or (4D) at the timing determined in step (2C), the frequency of performance data collection is automatically switched downward for the elements of which the notable state has been removed or to stop the collection. Therefore, the collection of the unrequired performance data can be suppressed.

In the case where the method of steps (2) to (4) is specifically determined in accordance with the designation (choice or parameter) acquired in step (1), the automation of data collection can be customized in a manner meeting the need of the storage network user.

According to this embodiment, the crucial data required for monitoring and tuning the performance of the storage network can be collected at an appropriate timing without fail while suppressing the collection of unnecessary data. As a result, the operation of monitoring the performance of a large storage network can be automated using a device of about the same capacity as in the prior art. Also, the overhead for the monitored devices can be reduced when acquiring data.

According to this invention, the method of collecting the data required for monitoring and tuning the performance of the storage network can be controlled in accordance with the parameters designated by the user. Also, the amount of the data collected and the objects for which the data are collected can be adjusted as required.

As a result, the operation of monitoring the performance of a storage network large in scale can be automated and the overhead thereof can be reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of collecting performance data for a system including a computer, a storage system, and a switch device coupled to the computer and the storage system, the method comprising:
    collecting a first performance data from a first element of an access path, used by the computer for accessing from the computer to the storage system via the switch device, the access path including connecting ports of the computer, the storage system and the switch device;
    selecting a second element of the access path based on relationship information including a relationship between the connecting ports included in the access path; and
    changing a collecting process of a second performance data from the second element of the access path if the first performance data collected from the first element of the access path indicates that a performance condition of the first element is satisfied, in order to determine a cause of the performance condition of the first element.

2. A method of collecting performance data for a system according to claim 1 further comprising,
    selecting a third element of the access path based on the relationship information at the same timing of the selecting the second element; and
    changing a collecting process of a third performance data to be collected from the third element of the access path,
    wherein the second element is located between the computer and the first element on the access path and the third element is located between the storage system and the first element on the access path.

3. A method of collecting performance data for a system according to claim 1, further comprising:
    selecting all elements of the access path based on the relationship information at the same timing of selecting the second element; and
    changing a collecting process of a performance data to be collected from the all elements of the access path.

4. A method of collecting performance data for a system according to claim 1,
    wherein the relationship information indicates a logical unit used by the computer via the access path, a parity group related to the logical unit and a physical disk drive related to the parity group, and further comprising:
    changing a collecting process of a fourth performance data to be collected from the logical unit, the parity group or the physical disk drive at the same timing of changing the collecting process of the second performance data.

5. A method of collecting performance data for a system according to claim 1,
wherein the performance condition of the first element is satisfied if a value of an item of the first performance data is greater/less than a predetermined reference value.

6. A method of collecting performance data for a system according to claim 5,
wherein the item of the first performance data is a data transfer speed.

7. A method of collecting performance data for a system according to claim 5,
wherein the item of the first performance data is a input/output number per second.

8. A method of collecting performance data for a system according to claim 1,
wherein the performance condition of the first element is satisfied if a change ratio of a value of an item of the first performance data is greater/less than a predetermined reference value.

9. A method of collecting performance data for a system according to claim 8,
wherein the item of the first performance data is a data transfer speed.

10. A method of collecting performance data for a system according to claim 8,
wherein the item of the first performance data is a input/output number per second.

11. A method of collecting performance data for a system according to claim 1,
wherein the collecting process of the second performance data of the second element is changed as that the second performance data is collected more/less frequently than before.

12. A method of collecting performance data for a system according to claim 1,
wherein the collecting process of the second performance data of the second element is started/stopped in accordance with the changing step.

13. A method of collecting performance data for a system including a computer, a storage system, and a switch device coupled to the computer and the storage system, wherein a relationship information of connecting ports of the computer, switch device and storage system indicates an access path from the computer to the storage system, the method comprising the steps of:
collecting first performance data from a first element of the access path;
determining if the first performance data indicates that a change in performance of the first element has occurred that satisfies a predetermined condition;
if it is determined that the change in performance of the first element does satisfy the predetermined condition, selecting a second element along the access path based on the relationship information and modifying a manner in which second performance data from the second element is collected in order to determine a cause of the change in performance of the first element.

14. A method of collecting performance data for a system according to claim 13, further comprising,
selecting a third element along the access path based on the relationship information at the same timing of the selecting the second element; and modifying a manner in which a third performance data from the third element is collected,
wherein the second element is located between the computer and the first element on the access path and the third element is located between the storage system and the first element on the access path.

15. A method of collecting performance data for a system according to claim 13, further comprising:
selecting all elements along the access path based on the relationship information at the same timing of selecting the second element; and
modifying a manner in which a performance data from the all elements of the access path is collected.

16. A method of collecting performance data for a system according to claim 13,
wherein the relationship information indicates a logical unit used by the computer via the access path, a parity group related to the logical unit and a physical disk drive related to the parity group, and further comprising:
modifying a manner in which a fourth performance data from the logical unit, the parity group or the physical disk drive is collected at the same timing of the modifying a manner in which the second performance data from the second element is collected.

17. A method of collecting performance data for a system according to claim 13,
wherein the change in performance of the first element does satisfy the predetermined condition if a value of an item of the first performance data is greater/less than a predetermined reference value.

18. A method of collecting performance data for a system according to claim 17,
wherein the item of the first performance data is a data transfer speed.

19. A method of collecting performance data for a system according to claim 17,
wherein the item of the first performance data is a input/output number per second.

20. A method of collecting performance data for a system according to claim 13,
wherein the change in performance of the first element does satisfy the predetermined condition if a change ratio of a value of an item of the first performance data is greater/less than a predetermined reference value.

21. A method of collecting performance data for a system according to claim 20,
wherein the item of the first performance data is a data transfer speed.

22. A method of collecting performance data for a system according to claim 20,
wherein the item of the first performance data is a input/output number per second.

23. A method of collecting performance data for a system according to claim 13,
wherein the manner in which the second performance data from the second element is collected is changed as that the second performance data is collected more/less frequently than before.

24. A method of collecting performance data for a system according to claim 13,
wherein the manner in which the second performance data from the second element is collected is started/stopped in accordance with the modifying step.

* * * * *